United States Patent
Eng et al.

(10) Patent No.: US 12,201,069 B2
(45) Date of Patent: *Jan. 21, 2025

(54) AUTOMATED CONTROL SYSTEM

(71) Applicant: Comcast Cable Communications, LLC, Philadelphia, PA (US)

(72) Inventors: Adam Eng, Denver, CO (US); Pat W. Goodwin, Castle Rock, CO (US); James A. Heffner, Parker, CO (US); Kevin Nervick, Conifer, CO (US); Paul Vaillancourt, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/849,832

(22) Filed: Jun. 27, 2022

(65) Prior Publication Data

US 2022/0394944 A1 Dec. 15, 2022

Related U.S. Application Data

(63) Continuation of application No. 16/733,468, filed on Jan. 3, 2020, now Pat. No. 11,399,475, which is a
(Continued)

(51) Int. Cl.
*A01G 25/16* (2006.01)
*G05B 15/02* (2006.01)

(52) U.S. Cl.
CPC .......... *A01G 25/167* (2013.01); *G05B 15/02* (2013.01)

(58) Field of Classification Search
CPC .............................. A01G 25/167; G05B 15/02
See application file for complete search history.

(56) References Cited

U.S. PATENT DOCUMENTS

| 5,208,855 A | 5/1993 | Marian |
| 8,793,024 B1 | 7/2014 | Woytowitz et al. |
| 2005/0103101 A1 | 5/2005 | Power |
| 2006/0116791 A1 | 6/2006 | Ravula et al. |

(Continued)

OTHER PUBLICATIONS

"ET Manager™ Cartridges", Rain Bird, retrieved Jun. 16, 2016, 2 pages. <http://www.rainbird.com/landscape/products/controllers/ETmanager.htm>.

(Continued)

*Primary Examiner* — Wissam Rashid
(74) *Attorney, Agent, or Firm* — Banner & Witcoff, Ltd.

(57) ABSTRACT

Aspects of the disclosure relate to a method that may include receiving a watering restriction for a location, detecting that a sprinkler controller is associated with a property within the location, and transmitting, to the sprinkler controller, the watering restriction. Additionally, a method may include receiving, at a sprinkler controller, a watering restriction for a location, the sprinkler controller associated with a property within the location, and adjusting, in response to the watering restriction, a sprinkling schedule for the property. Furthermore, a method may include receiving weather prediction information associated with a property, updating, in response to the weather prediction information, a sprinkling schedule for a sprinkler system associated with the property, receiving, after a time period, updated weather prediction information for the property, and updating the sprinkling schedule based on a comparison between the sprinkling schedule and the weather prediction information over the time period.

28 Claims, 9 Drawing Sheets

Related U.S. Application Data continuation of application No. 15/398,544, filed on Jan. 4, 2017, now Pat. No. 10,555,462, which is a continuation of application No. 14/177,427, filed on Feb. 11, 2014, now Pat. No. 9,565,810.

(56) References Cited

U.S. PATENT DOCUMENTS

| | | | |
|---|---|---|---|
| 2009/0099701 A1* | 4/2009 | Li | A01G 25/16 700/284 |
| 2010/0012744 A1* | 1/2010 | Kates | B05B 3/021 239/11 |
| 2011/0035063 A1 | 2/2011 | Palayur | |
| 2012/0084115 A1* | 4/2012 | Cline | G06Q 10/0633 705/7.27 |

OTHER PUBLICATIONS

Springler System SMART Controller Systems, Rainfall Irrigation & Outdoor Lighting, retrieved Jun. 16, 2016, 3 pages. <http://www.rainfallirrigation.com/rainfall_irrigation_smart_sprinkler_controllers.html>.

Evaluation of California Weather-Based "Smart" Irrigation Controller Programs, Presented to the CA Dept. of Water Resources, Jul. 1, 2009, The Metropolitan Water District of Southern California and The East Bay Municipal Utility District, Proposition 13 Urban Water Conservation Outlay Grant Agreements 4600003098 and 4600003099.

Ingfei Chen. "Smart Irrigation: A Supercomputer Waters the Lawn." Jul. 4, 2011, 10 pages, <http://www.scientificamerican.com/article/smart-irrigation-a-superc/>.

* cited by examiner

AUTOMATED CONTROL SYSTEM

CROSS-REFERENCES TO RELATED APPLICATIONS

The present application is a continuation of U.S. application Ser. No. 16/733,468, filed Jan. 3, 2020, which is a continuation of U.S. application Ser. No. 15/398,544, filed on Jan. 4, 2017, now U.S. Pat. No. 10,555,462, which is a continuation of U.S. application Ser. No. 14/177,427, filed on Feb. 11, 2014, now U.S. Pat. No. 9,565,810, the entireties of which are herein incorporated by reference.

BACKGROUND

Sprinkling controllers currently lack the necessary sophistication to adequately provide sufficient specificity, connectivity, and control to adequately meet needs of many users. Aspects herein address these and other issues and provide systems and methods for improved delivery of maintenance services for the home such as sprinkler-control services.

SUMMARY

Hence, some aspects of the disclosure relate to methods for an improved sprinkler system.

A method may include receiving, at a computing device, a watering restriction for a location, detecting that a sprinkler controller is associated with a property within the location, and transmitting, to the sprinkler controller, the watering restriction. Alternatively or additionally, the computing device may register sprinkler controllers within certain locations and update them based on changes in watering restrictions for those locations. Alternatively or additionally, the watering controllers may receive periodic updates and filter those updates based on geographic information.

The method may alternatively or additionally include responding to the watering restriction by adjusting a sprinkling schedule for the property. The method may include receiving confirmation that the sprinkler controller associated with the property responded to the watering restriction by adjusting the sprinkling schedule for the property, and transmitting, to an entity issuing the watering restriction, the confirmation. Alternatively or additionally, the entity issuing the watering restriction may charge a lower water rate for the property in response to the confirmation.

Alternatively or additionally, the location may include one or more geopolitical entities such as a city, county, state, borough, municipality, territory, self-governing entity, township, incorporated area, administrative division, district, village, neighborhood, or any portions of the foregoing—such as even and odd street numbers—and the watering restriction may include restrictions relevant to the one or more geopolitical boundaries or any portions thereof. The method may also include receiving various different watering restrictions associated with one or more geopolitical boundaries that may be associated with one or more locations, detecting that a sprinkler controller is associated with a property within one or more of the geopolitical boundaries, and transmitting, to the sprinkler controller, various different watering restrictions as appropriate for that particular location or address. Alternatively or additionally, the location may include a subsection of a county, and the different location may include a different subsection of the county.

Alternatively or additionally, the method may include requesting the watering restriction for the location from a computing device, wherein an entity that issues the watering restriction for the location communicates with the computing device to provide the watering restriction. The computing device may itself communicate with various administrative servers or personnel associated with different geopolitical boundaries, aggregate the various information, then distribute that information as requested or automatically. Alternatively or additionally, the computing device may maintain a database of geographic information associated with one or more control systems (e.g., sprinkler systems), which it may service. Alternatively or additionally, the computing device may correspond with one or more entities associated with one or more geopolitical boundaries and determine when to send updates to particular control systems (which may identifiable using an IP address) responsive to updates in restrictions (e.g., water, electric, or other restrictions imposed upon that geopolitical boundary).

Alternatively or additionally, the method may include receiving weather information for the location, and transmitting the weather information to the sprinkler controller. The sprinkler controller may respond to the weather information by adjusting a sprinkling schedule for the property. The weather information may include current weather information as well as future predicted weather and temperature information. For example, if rain and cooler temperatures are expected, the system may delay further watering even though it may otherwise water at that time.

Alternatively or additionally, the method may include receiving a soil-moisture content reading from a different sprinkler controller associated with a different property within the location, determining that a distance from the different property to the property falls within a threshold, and transmitting, to the sprinkler controller, the soil-moisture content reading from the different sprinkler controller. The sprinkler controller may respond to the soil-moisture content reading by adjusting a sprinkling schedule for the property. Additionally, adjusting the sprinkling schedule for the property may include comparing a soil type for the property and a soil type for the different property, a result of the comparing may then impact the sprinkling schedule for the property. Furthermore, the soil type for the property or the soil type for the different property may include at least one of a percolation rate, a precipitation rate, and an infiltration rate. The soil types may be derived from geographic mapping data using a geopolitical boundary such as a county (e.g., GIS soil type mapping data). The soil types may then be associated with different geographic addresses and utilized in the sprinkling control system either locally or at a remote unit such as a server. This information may also be included in a database record associated with the particular geographic location.

Another method may include receiving, at a sprinkler controller, a watering restriction for a location, the sprinkler controller associated with a property within the location, and adjusting, in response to the watering restriction, a sprinkling schedule for the property. This control may be provided from a centralized location, allowing the control for the sprinkler at each individual home to be much less expensive. Thus, a sophisticated sprinkler control system may be provided to many homes with a small incremental cost by centralizing the control function for the sprinkler system at a network connected (e.g., internet) controller, providing for smart phone/tablet/web-page control, and minimizing the end-unit processing power. For example, the sprinkler controller may simply be a single application-specific integrated circuit (ASIC), controller, or even more simply a logic circuit with non-volatile periodically updated memory with all of the maintenance, interface, and control functions being centralized in a controller. In this manner, the incremental cost of the individual sprinkler control system may be minimized.

The method may also include adjusting a different sprinkling schedule for different zones of the property. For example, each sprinkler may be configured to triangulate its position within the property using Bluetooth, wireless, global positioning system (GPS), manual, and/or other positioning techniques. The outline of the plot on the user's location may be obtained from, for example, geographic information system (GIS) data. The outline plot of the user's lot may be displayed to the user with the approximate location of the user's home, the determined location of each of the sprinklers, and the user or system may determine the sprinkler schedule based on an individualized basis. For example, the schedule for the location watering the flower beds may be different from the locations watering the grass, which may be different further than the locations watering the vegetable garden. Alternatively or additionally, the sprinklers along the front walk, sidewalk, and driveway may be different from those sprinklers less likely to impact a user's daily activities. Additionally, there may be within the zone of the property any number of sensors (e.g., a soil-moisture sensor) that detects various environmental conditions such as soil-moisture content of soil within the zone of the property. The sprinkler controller may adjust the sprinkling schedule for the zone of the property in response to a combination of the watering restriction and the soil-moisture content of the soil within the zone of the property.

Alternatively or additionally, the method may include transmitting, to a user device, the sprinkling schedule for the property, receiving, from the user device, a request to adjust the sprinkling schedule for the property, and adjusting, in response to the request, the sprinkling schedule for the property. For example, a user may be provided with a user interface for controlling a sprinkler system. The interface may show the outlines of the property. The user may be able to walk around the property and geographically mark individual sprinklers using the GPS/triangulation function of a home touchscreen controller (e.g., a smartphone, tablet, or mobile computing device). Alternatively or additionally, the user may be able to associate these geographic locations with different types of locations such as lawn, flower garden, vegetable garden, newly planted grass, grass, driveway, and/or sidewalk. The user may tap on certain sprinklers or locations within the property and adjust the sprinklers in that location, that and other locations, or the entire property.

Alternatively or additionally, the method may include transmitting, to a user device, an alert associated with the sprinkling schedule for the property. For example, one alert may be that the sprinkler system is about to go off in five minutes. The alert may be associated with the geographic location of the user's smart phone. For example, where the user is determined to be in the sprinkler zone, the sprinkler may alert the user that the sprinkler is about to go off. Alternatively or additionally, the sprinkler system may automatically shut off as it determines that the user is approaching an active sprinkler and then reactivate as the user leaves the location. This system may also be used on commercial properties such as golf courses and coupled to smart phone applications as well as transport systems such as golf carts or golf bags. As the user moves about the property, the sprinkler system is interrupted and then reset to its original program as the individual moves about the property.

Alternatively or additionally, a method may include receiving, by a computing device, weather prediction information associated with a property, updating, in response to the weather prediction information, a sprinkling schedule for a sprinkler system associated with the property, receiving, after a time period, updated weather prediction information for the property, and updating the sprinkling schedule based on a comparison between the sprinkling schedule and the weather prediction information over the time period. For example, if rain is predicted on Monday, Wednesday, and Thursday, the sprinkler system may have one setting. As time passes and it is determined that it in fact did not rain on Monday or Wednesday, but that it did rain on Thursday and is expected to rain again on Friday and Saturday, the sprinkling schedule is dynamically adjusted and updated as the weather information changes.

Alternatively or additionally, the comparison may include determining that the sprinkling schedule was adjusted to compensate for the weather prediction information. Additionally, the updated weather prediction information may indicate that actual weather was different than predicted weather. In this manner, the watering system may provide optimal watering in a dynamic manner as predictions change, come true, and are proved false.

The preceding presents a simplified summary in order to provide a basic understanding of some aspects of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
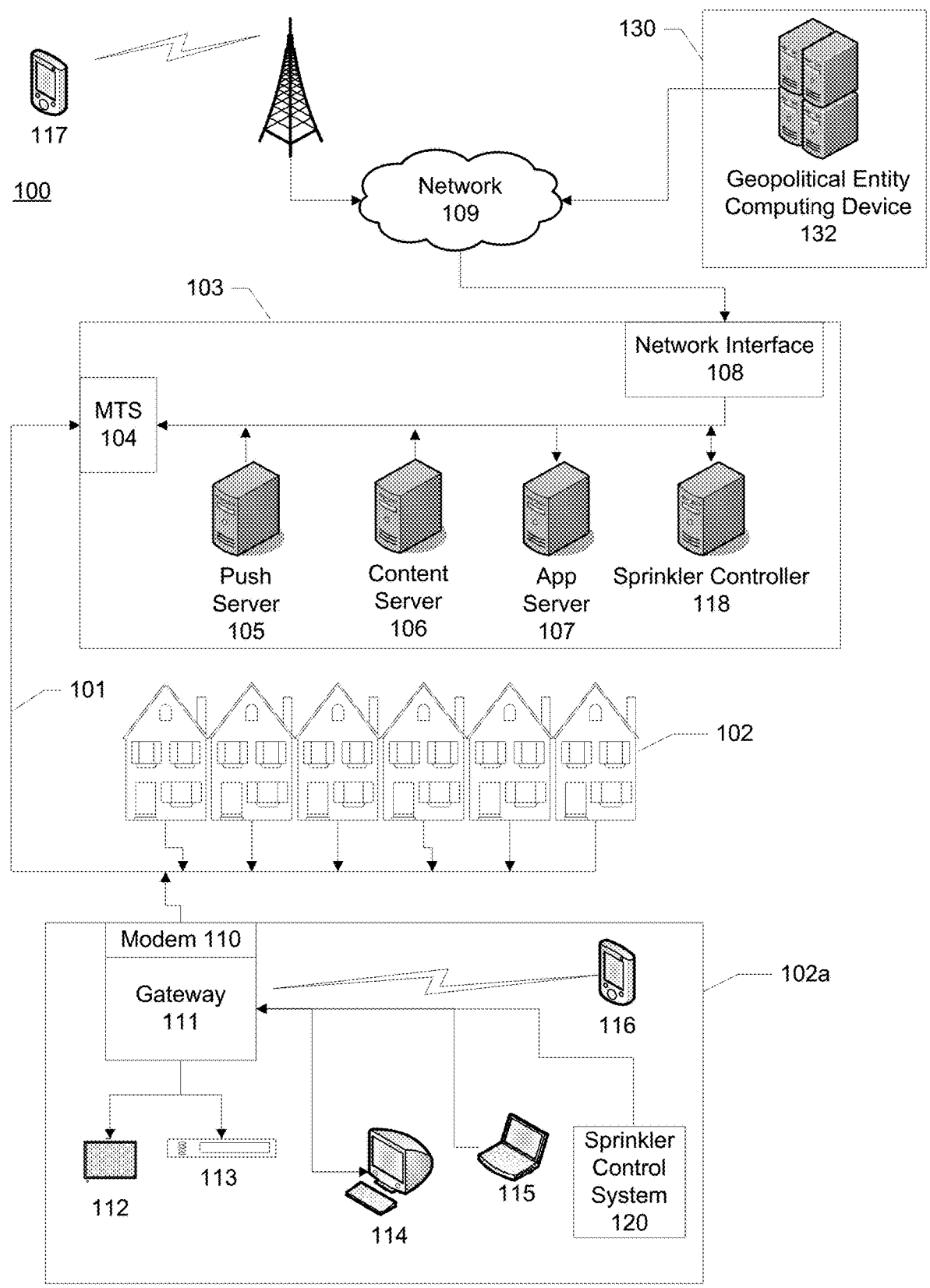
FIG. 1 illustrates an example information distribution network.

FIG. 1 illustrates an example information distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax distribution network. Such networks 100 use a series of interconnected communication lines 101 (e.g., coaxial cables, optical fibers, wireless, etc.) to connect multiple premises 102 (e.g., businesses, homes, consumer dwellings, etc.) to a central office 103 or headend. The central office 103 may transmit downstream information signals onto the lines 101, and each premise 102 may have a receiver used to receive and process those signals.

There may be one line 101 originating from the central office 103, and it may be split a number of times to distribute the signal to multiple premises 102 in the vicinity (which may be many miles) of the central office 103. The lines 101 may include components not illustrated, such as splitters, filters, amplifiers, etc. to help convey the signal clearly, but in general each split introduces a bit of signal degradation. Portions of the lines 101 may also be implemented with fiber-optic cable, while other portions may be implemented with coaxial cable, other lines, or wireless communication paths. By running fiber optic cable along some portions, for example, signal degradation in those portions may be significantly minimized, allowing a single central office 103 to reach even farther with its network of lines 101 than before.

The central office 103 may include a modem termination system (MTS) 104, such as a cable modem termination system (CMTS), which may be a computing device configured to manage communications between devices on the network of lines 101 and backend devices such as servers 105-107 (to be discussed further below). The MTS may be as specified in a standard, such as the Data Over Cable Service Interface Specification (DOCSIS) standard, published by Cable Television Laboratories, Inc. (a.k.a. CableLabs), or it may be a similar or modified device instead. The MTS may be configured to place data on one or more downstream frequencies to be received by modems at the multiple premises 102, and to receive upstream communications from those modems on one or more upstream frequencies. The central office 103 may also include one or more network interfaces 108, which can permit the central office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the network 109, and to other devices on the network such as a cellular telephone network and its corresponding cell phones.

As noted above, the central office 103 may include a variety of servers 105-107 that may be configured to perform various functions. For example, the central office 103 may include a push notification server 105. The push notification server 105 may generate push notifications to deliver data or commands to the multiple premises 102 in the network (or more specifically, to the devices in the multiple premises 102 that are configured to detect such notifications). The central office 103 may also include a content server 106. The content server 106 may be one or more computing devices that are configured to provide content to users in the homes. This content may be, for example, video on demand movies, television programs, songs, text listings, etc. The content server 106 may include software to validate user identities and entitlements, locate and retrieve requested content, encrypt the content, and initiate delivery (e.g., streaming) of the content to the requesting user or device.

The central office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX, and COMET). For example, an application server may be responsible for collecting television program listings information and generating a data download for electronic program guide listings. Another application server may be responsible for monitoring user viewing habits and collecting that information for use in selecting advertisements. Another application server may be responsible for formatting and inserting advertisements in a video stream being transmitted to the multiple premises 102. And as will be discussed in greater detail below, another application server may be responsible for sending, receiving, or processing data related to a sprinkler system.

The central office 103 may include one or more sprinkler controllers 118. A sprinkler controller 118 may be a computing device configured to interface with or control one or more sprinkler control systems 120 (e.g., a control server or home-appliance control server).

The network 109 may be connected to one or more computing devices 132 associated with one or more geopolitical entities 130 (e.g., a city, county, state, borough, municipality, territory, self-governing entity, township, incorporated area, administrative division, district, village, neighborhood, or any portion of the foregoing).

An example premise 102a may include a modem 110, which may include transmitters and receivers used to communicate on the lines 101 and with the central office 103. The modem 110 may be, for example, a coaxial cable modem (for coaxial cable lines 101), a fiber interface node (for fiber optic lines 101), or any other desired modem device. The modem 110 may be connected to, or be a part of, a gateway interface device 111. The gateway interface device 111 may be a computing device that communicates with the modem 110 to allow one or more other devices in the home to communicate with the central office 103 and other devices beyond the central office. The gateway 111 may be a set-top box (STB), digital video recorder (DVR), computer server, or any other desired computing device. The gateway 111 may also include (not shown) local network interfaces to provide communication signals to devices in the home, such as televisions 112, additional STBs 113, personal computers 114, laptop computers 115, wireless devices 116 (wireless laptops and netbooks, mobile phones, mobile televisions, personal digital assistants (PDA), etc.), a sprinkler control system 120, and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
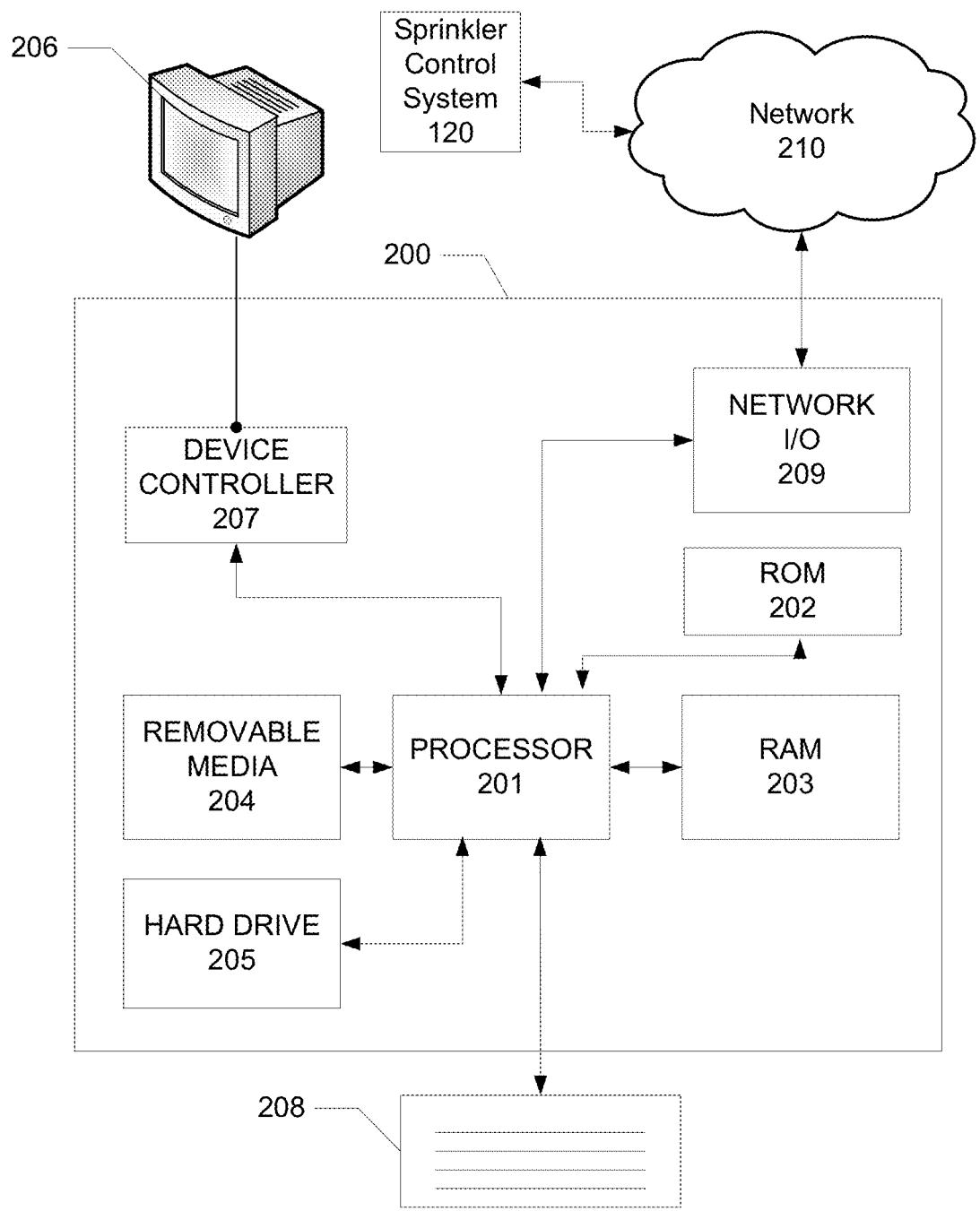
FIG. 2 illustrates an example hardware platform on which the various elements described herein can be implemented.

FIG. 2 illustrates general hardware elements that can be used to implement any of the various computing devices discussed above. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as network input/output circuit 209 (such as a network card) to communicate with an external network 210. The network input/output circuit 209 may be a wired interface, wireless interface, or a combination of the two. In some embodiments, the network input/output circuit 209 may include a modem (e.g., a cable modem), and network 210 may include the communication lines 101 discussed above, the external network 109, an in-home network, a provider's wireless, coaxial, fiber, or hybrid fiber/coaxial distribution system (e.g., a DOCSIS network), or any other desired network.

The computing device 200 may be connected to a sprinkler control system 120 through a network 210. Alternatively or additionally, the computing device 200 may be directly connected to the sprinkler control system 120 (e.g., through a wired or wireless connection).

Figure 3:
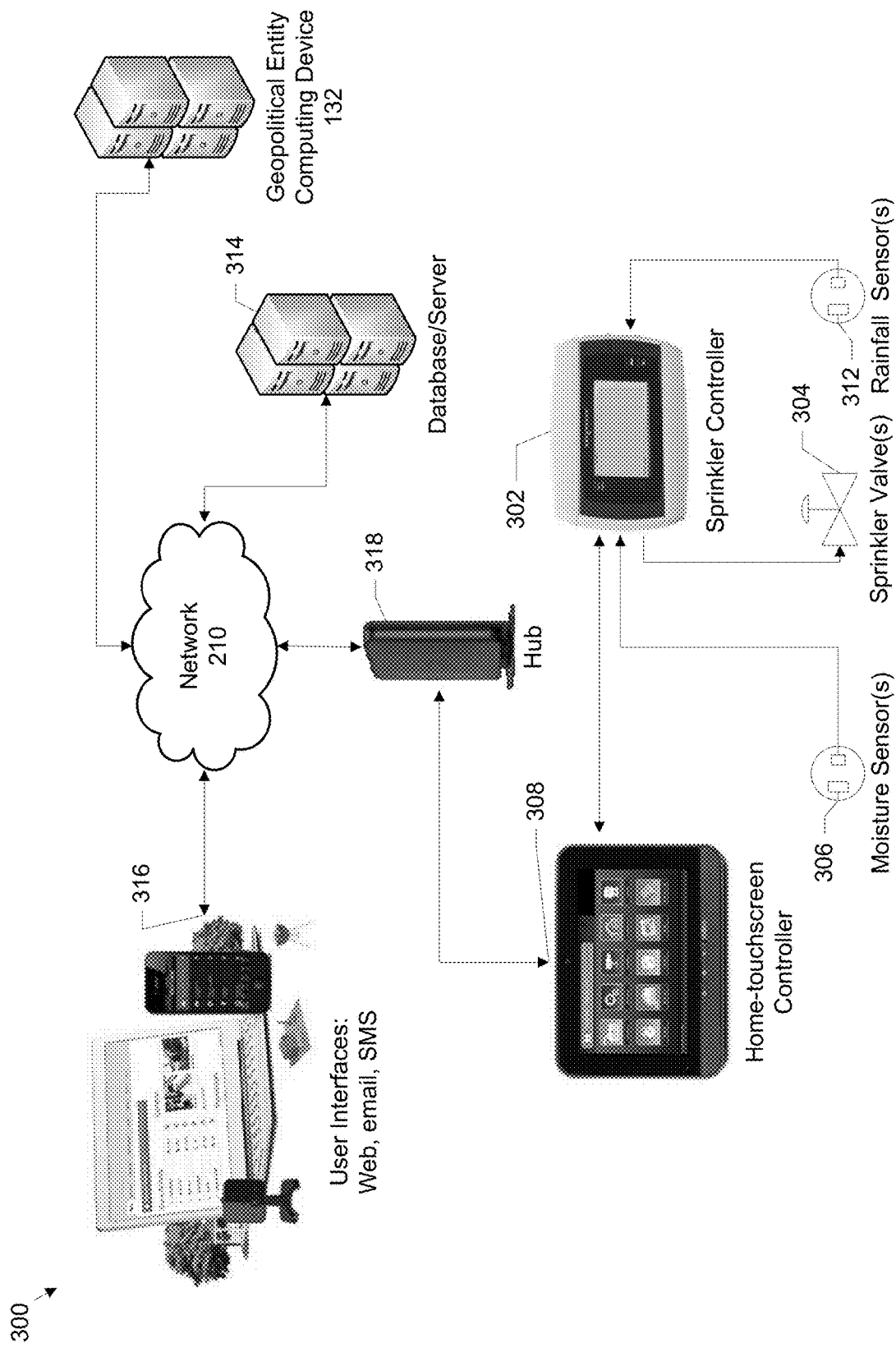
FIG. 3 illustrates an example embodiment of a sprinkler system according to one or more aspects of the disclosure.

FIG. 3 illustrates an example embodiment of a sprinkler system 300 according to one or more aspects of the disclosure.

A property may have an associated sprinkler system 300. In one embodiment, the sprinkler system 300 may be similar to or the same as the sprinkler control system 120 described in connection with FIG. 1. A sprinkler system 300 may be associated with an entire property, such as a lot according to a county plat map. In another example, a sprinkler system 300 may be associated with more than one property, such as several lots with several homes. In a different example, a sprinkler system 300 may be associated with only a part of a property. There may be more than one sprinkler system 300 associated with a property, such as if a property is divided into zones, with one sprinkler system 300 associated with each zone. Alternatively or additionally, a sprinkler system 300 may cover multiple zones of a property, each zone with its own sprinkler schedule. Zones will be discussed in further detail below. Alternatively or additionally, a property or part thereof may be associated with more than one sprinkler system 300.

A sprinkler system 300 may be configured to deliver water to a property using one or more sprinkler valves 304. For example, a sprinkler system 300 may be connected to a well, a county irrigation system, or a home's water supply, and deliver that water to a property. A sprinkler system 300 may deliver potable water, non-potable water, or some combination. For example, the sprinkler system 300 may utilize well water for some applications and some water restrictions and municipality provided water for other applications and/or water restriction conditions. In another example, the sprinkler system 300 may deliver another liquid, such as a chemical. For example, different lawn treatment applications may be provided in the sprinkler system. The system may have certain canisters installed that deliver predetermined amounts of fertilizer, pesticides, nitrogen, grub treatments, fungicides, and/or other chemicals to the soil, grass, flower garden, vegetable garden, starter lawn, etc. For example, the sprinkler system 300 may deliver fertilizer, pesticide, weed killer, or some other chemical based on either a solid or liquid concentrate that may then be dissolved in water. These additions may be provided in canisters that may be periodically updated, replaced, and/or refilled. In one embodiment, a sprinkler system 300 may be configured to simultaneously deliver water and one or more other chemicals. Alternatively or additionally, a sprinkler system 300 may only deliver one liquid at a time. In certain embodiments, the sprinkler system may detect the presence of people and pets, and delay the application of a chemical treatment. The sprinkler system may also report shortages in any of the chemicals to an upstream location and indicate the need for maintenance. For example, where the sprinkler system determines that more fertilizer is required, it may indicate to the server that a service representative needs to place a call, e-mail, and/or text to the home and/or account to schedule an appointment.

The water additive is not necessarily limited to a sprinkler system but may also apply to any water treatment system such as a water softener or water neutralizer. For example, where the water softener needs salt or the water neutralizer needs maintenance, this may also be communicated to the centralized system so that service may be scheduled.

The sprinkler system 300 may be associated with a sprinkler controller 302. In one embodiment, the sprinkler controller 302 may be similar to or the same computing device 200 described in connection with FIG. 2. For example, the sprinkler controller 302 may include a display, one or more buttons, a touch interface, a wired or wireless remote control, a keyboard, a mouse, or another interface device. The sprinkler controller 302 may include a processor that enables it to perform many or all of the functions described herein.

Alternatively or additionally, a sprinkler controller 302 may also be a separate module hung on a hose. In other words, the sprinkler controller 302 need not be a module in a user's home. The sprinkler controller 302 may be a battery-powered module, hooked to a security system via Bluetooth, wireless, wifi, the scientific 4.33 Mhz band for low-power operation, or other similar connections.

Alternatively or additionally, the sprinkler controller 302 may include a low-cost configuration with minimal interface where most of the processing and control is conducted in the server and wirelessly connected devices such as a smart phone. For example, referring back to FIG. 1, a central office 103 may include a home appliance control server (e.g., sprinkler controller 118) that performs most of the processing and control of the sprinkler system 120 for a premise 102a.

In one embodiment, a home appliance control server may include or function as a sprinkler controller 118. That is, the sprinkler controller 118 may perform many or all of the functions described herein as being performed by the sprinkler controller 302. The sprinkler controller 118 may receive command requests from and transmit control commands to the sprinkler control system 120 over the network 210. In one embodiment, an individual home or property sprinkler system 300 may include a more basic sprinkler controller 302 (e.g., an ASIC) that simply responds to commands sent to it by the sprinkler controller 118. In one embodiment, the sprinkler controller 118 may communicate directly with the sprinkler controller 302. For example, the sprinkler controller 118 may address transmissions using an identifier (e.g., headend-assigned control number, IP address, or MAC address) of the sprinkler controller 302. In this manner, the sprinkler controller 118 may reduce the need for complicated hardware in the local sprinkler controller 302, because the sprinkler controller 118 performs much of the processing and control logic that otherwise may be done by a local sprinkler controller 302. The more basic sprinkler controller 302 may thereby allow a property to receive the benefit of automated home sprinkler control without necessitating the purchase and installation of a high cost system.

Alternatively or additionally, the sprinkler controller 118 may send out commands that a sprinkler controller 302 filters. A sprinkler controller 302 may therefore be a lower cost unit (e.g., with less powerful or cheaper hardware), because the sprinkler controller 118 at the central office 103 may perform some or all of the processing needs for controlling the sprinkler system. In one embodiment, a sprinkler controller 302 may receive all broadcast commands from a sprinkler controller 118, but only act on those that apply. For example, a sprinkler controller 118 may broadcast a command to all sprinkler controllers 302 connected to the sprinkler controller 118, but the command may only apply to sprinkler controllers 302 located in a certain part of a county. The sprinkler controller 302 may therefore receive all the commands broadcast by the sprinkler controller 118, but filter those that do not apply, only acting on those that apply to the part of the county that the sprinkler controller 302 is located in.

The sprinkler controller 302 also may interface with a security system. For example, a security system may include a home-touchscreen controller 308 that allows a user to interface with a security system. A further discussion of different user interfaces 316 for interfacing with the sprinkler system 300 will follow below.

A sprinkler controller 302 may display information related to one or more features of the sprinkler system 300. For example, the display may show a sprinkling schedule. The sprinkler controller 302 may also allow input for interacting with a feature of the sprinkler controller 302. Interaction with a sprinkler controller 302 may result in adjusting a sprinkling schedule for an associated property.

The sprinkler controller 302 may track water usage rates. For example, a sprinkler controller 302 may track the amount of water used over a period of time, such as a day, week, month, year, or the life of the system. In another example, a sprinkler controller 302 may display maximum and minimum usage rates and times. A sprinkler controller 302 may also track water cost rates. For example, in some places, water at certain times of the day or year cost more than water at other times of the day or year. A sprinkler controller 302 may provide an overlay or other method for comparing water usage with water cost. Additionally, the sprinkler system 300 may schedule sprinkling to minimize water cost and comply with local government restrictions.

In one embodiment, a sprinkler controller 302 may adjust a sprinkler schedule in order to maximize cost savings. For example, the sprinkler controller 302 may detect that the sprinkler system 300 is watering the lawn at the time of day when the water cost rates are highest. The sprinkler controller 302 may determine that by adjusting the sprinkler schedule, the user may experience a decrease in water cost rates. The sprinkler controller 302 may automatically make an adjustment, or may prompt a user to make a manual adjustment.

The sprinkler controller 302 may track water usage rates for the sprinkler system 300 as a whole, or for individual parts of the sprinkler system 300, such as individual zones, or individual sprinkler valves 304. The sprinkler controller 302 may use water usage rates to detect maintenance needs for the sprinkler system 300. For example, if an individual sprinkler valve 304 is broken, it may use water at an increased rate. For example, the sprinkler valve 304 may be cracked or have had its head cut off by a lawnmower. There may be some other problem with the sprinkler valve 304. Whatever the problem, if the sprinkler valve 304 uses water at an increased rate, the sprinkler controller 302 may detect that sprinkler valve 304's water usage rate is higher than normal.

The sprinkler controller 302 may detect that sprinkler valve 304's water usage rate is higher than normal by tracking average water usage rates for individual sprinkler valves 304 over a period of time, comparing new readings with historical values. Alternatively or additionally, the sprinkler controller 302 may compare individual sprinkler valve 304 water usage rates against each other. For example, if a sprinkler system includes ten similar individual sprinkler valves 304, then comparing their usage rates against each other may allow a sprinkler controller 302 to detect if one or more individual sprinkler valves 304 is not operating correctly.

Note that in some embodiments of the sprinkler system 300, there may be different types of sprinkler valves 304. For example, one sprinkler valve 304a may be a bubbler (not shown), while a different sprinkler valve 304b may be a rotating head (not shown). If different sprinkler valves 304a, 304b are different types, it may not be helpful in determining maintenance issues to compare water usage rates between them.

Alternatively or additionally, a sprinkler controller 302 may compare water usage rates between different types of sprinkler valves 304a, 304b to determine other helpful information in setting or adjusting a sprinkler schedule. For example, if a certain plant needs a certain amount of water per day, the sprinkler controller 302 may use the water usage rates to ensure that the sprinkler schedule is properly adjusted so that plant receives sufficient water. For example, a certain lilac bush may consume one gallon of water per day. The sprinkler controller 302 may determine that a bubbler sprinkler valve 304a may take one hour to deliver one gallon of water, while a rotating head valve 304b may take two hours to deliver one gallon of water. The sprinkler controller 302 may deliver water for one or two hours depending on if the sprinkler valve 304 placed near the certain lilac bush is a bubbler 304a or a rotating head 304b.

Alternatively or additionally, the sprinkler controller 302 may adjust water usage in all or part of the sprinkler system 300. For example, the sprinkler controller 302 may adjust the water flow rate. For example, the water flow may be restricted at the source, limiting the amount of water going to the individual sprinkler valves 304. For example, if normal usage is 10 gallons per minute, the sprinkler controller 302 may restrict the water flow rate to 8 gallons per minute. Adjusting the water flow rate may result in less water pressure at each of the valves, but less water usage overall. In another example, the sprinkler controller 302 may increase water flow to increase water pressure at each of the sprinkler valves 304. Alternatively or additionally, the sprinkler controller 302 may adjust water flow at only a part of the sprinkler system 300, such as at certain valves. For example, the sprinkler controller 302 may reduce or turn off water flow to certain sprinkler valves 304, while potentially increasing or maintaining water flow to one or more other sprinkler valves 304.

Alternatively or additionally, a sprinkler system 300 may include multiple types of sprinkler valves 304 that have overlapping delivery locations. The sprinkler controller 302 may track the water delivery rates of the different valves 304 to ensure that the vegetation on the property is properly watered.

In order to ensure proper watering, a sprinkler system 300 may include one or more zones. For example, one sprinkler system 300 may use the same sprinkling schedule for all of the sprinkler valves 304 in the system. In that example, there may be effectively one zone. In a different sprinkler system 300, there may be two, three, or more zones. Each zone may have a different sprinkling schedule.

Different sprinkler valves 304 within the same zone may water at different rates. This may be based on the placement of the sprinkler valve 304. For example, one sprinkler valve 304 may be at the top of a hill, where a second sprinkler valve 304 may be at the bottom of the hill. The sprinkler valve 304 at the top of the hill may water less than the sprinkler valve 304 at the bottom of the hill, to compensate for the water running down the hill. Both sprinkler valves 304 may be in the same zone, despite having different watering rates.

A sprinkling profile may be associated with a watering zone. Each sprinkling profile may vary based on a number of factors. For example, different factors may include the size of the zone, the type of vegetation in the zone, the terrain of the zone—such as its slope—the soil type of the zone, the amount of sunshine or shade in the zone, the ambient temperature in the zone, the amount of wildlife in the zone, or another factor. Any factor may be related to a zone that is only a part of a property, or may be related to the property as a whole. Any zone factor may also be applied to a profile as a whole, and vice versa.

The criteria for a watering profile may be predetermined. For example, a sprinkler controller 302 may come preprogrammed with one or more profiles that contain different watering schedules based on different factors.

For example, a system may come with several different profiles that allow the user to select a type of vegetation. Each profile may include information such as a vegetation type and a watering amount. A watering profile may include additional criteria as well.

For example, a property may be located within a particular zip code. A sprinkler controller 302 may adjust a sprinkler profile based on information related to that zip code. Every zone within the property may be within the same zip code, and therefore all the profiles or zones controlled by the controller may be adjusted for the same zip-code-related factors.

In another example, a property may be divided, such as by a zip code, county line, city line, state, or even country border. A sprinkler controller 302 may adjust a watering profile based on the different limitations, restrictions, or even geographic differences between the different locations or demarcations. For example, one county may include one set of watering restrictions, and a second county may impose a different set of watering restrictions. The sprinkler controller 302 may adjust the watering schedules for the different parts of the property based on the restrictions imposed by the different counties.

A location (e.g., a county) may impose watering restrictions. A watering restriction may affect the total amount of water a property may use over a period of time (e.g., day, week, month), or specific times that property may use water (e.g., only allow watering from 6 am-10 am). A watering restriction may be for an entire location (e.g., county-wide), or may be different based on a property's location (e.g., certain part of a county, certain address, etc.). A watering restriction may affect water price (e.g., first 100 gallons per week cost $0.10 per gallon, every gallon after that costs $0.15 per gallon). A watering restriction may restrict certain water uses (e.g., may only use water for watering lawn, but not gardens or flower beds).

An example watering restriction may be an odd-numbered street address can water for a maximum of 15 minutes on Thursdays and Sundays, from 7:00 pm to 4:00 am. The same watering restriction may allow an even-numbered street address to water for a maximum of 15 minutes on Wednesdays and Saturdays, from 7:00 pm to 4:00 am. The same watering restriction may not allow any watering on Mondays or Fridays, but may allow any address to water on Tuesdays for a maximum of 10 minutes from 6:00 pm to 5:00 am. Of course, the given restrictions are only exemplary—any number of combinations of factors may be used for restricting water use.

A watering restriction may be based on a property's location. For example, a county restriction may be based on address, location within the county, zones within the county. The sprinkler controller 302 may overlay the address of the user—which a service provider may maintain at another location, such as a central hub or server 314, as well as longitude/latitude—to determine proper zones within the county. The sprinkler controller 302 may also apply address—such as even or odd—restrictions (e.g., Sat or Sun), or even different times within those days.

A sprinkler controller 302 may interface with a service provider server 314. A service provider may provide a centralized administration with access to the logic thresholds and other control options. These options can be downloaded into sprinkler controllers 302 locally, or managed at a head end (e.g., server 314). A server 314 may provide updates as to the logic with respect to the operation of the sprinkler controllers 302, or download additional firmware. A server 314 may modify the best practices or watering profiles with respect to the sprinkler controllers 302 based on a headend location and feedback from an administrator.

The sprinkler controller 302 may adjust a sprinkler schedule based on a watering restriction. In one embodiment, a server 314 may receive a watering restriction for a location. For example, a server 314 may receive a watering restriction from a county. The watering restriction may cover an entire county, or a part of a county. Alternatively or additionally, the watering restriction may cover an area larger than a single county, such as multiple counties, or an entire state or country. Alternatively or additionally, the watering restriction may be smaller than a single county, such as a subsection of a county, or a combination of subsections of multiple counties.

The server 314 may detect that a sprinkler controller 302 is associated with a property within the county. The server 314 may send the watering restriction to the sprinkler controller 302.

The sprinkler controller 302 may respond to the watering restriction by adjusting a sprinkling schedule for the property. Alternatively or additionally, the server 314 may directly transmit a command to the sprinkler controller 302 to adjust the sprinkler schedule directly.

The sprinkler controller 302 may transmit a confirmation that the sprinkler schedule was adjusted to conform with the watering restriction. For example, the sprinkler controller 302 may transmit a confirmation to the server 314, or may transmit a confirmation directly to the county or another entity issuing the watering restriction. In one embodiment, the entity issuing the watering restriction may charge a lower water rate for the property in response to the confirmation.

The server 314 may receive a different watering restriction for a different location (e.g., a different part of the county). The server 314 may detect that a different sprinkler controller 302 is associated with a different property within the different location. The server 314 may transmit to the different sprinkler controller 302 the different watering restriction. In one embodiment, the location may include a subsection of a county, and the different location includes a different subsection of the county.

Alternatively or additionally, server 314 may request the watering restriction for the location from a different computing device. For example, a county or other geopolitical entity may provide a watering restriction to a computing device 132 that the server 314 communicates with to obtain the watering restriction.

For example, a county may have a county portal that may access a computing device 132. A portal may allow a county or city to enter or otherwise provide watering information.

A service provider may provide a county or other entity with a software development kit (SDK) that allows the entity to provide watering restrictions in a unified format.

Alternatively or additionally, a county may use an application programming interface (API) for providing data (e.g., watering restrictions). For example, a service provider may publicize a standardized data format for providing sprinkler restriction information from a county to a service provider. The data may come in as an SMS message, a webpage, an email, JSON, XML, or some other standardized format. The data may be a new standardized format that may be automatically read by a service provider's system. The data may be parsed, filtered, and/or analyzed to determine that the parameters were within the expected parameters, then input into a service provider's system once it met the quality control checks.

Each county may have data in a different place, system, or format. The SDK may not be completely plug-and-play. The SDK may be a system that the county may need to hook their data up to. A service provider may provide instructions as necessary, then let the city or county know that the service provider may give them assistance. The county may need to hook data up to what the service provider may provide in the SDK. Then the county may start providing the data, and the service provider may interface with the data.

In another example, a service provider may pull the data from a county webpage, or the county may enter it into the service provider's system directly, or both.

An SDK may be used to create a service that a service provider may then call. The county may hook the county data up to the service, then a service provider may call that service to get that data. Alternatively or additionally, data may be formatted differently between different counties.

A county portal may also provide other information. For example, a county portal may include weather information. The weather information may be something that a service provider itself maintains, or may be pulled directly from a county information page. For example, if the county posts specific weather information on a web page, the server may have an interface for visiting that web page and pulling down the county-specific rain information. The rain information may be downloaded into this system, then pushed out to all of the sprinkler controllers 302 that are connected to a service provider system.

A server 314 may allow a county to push out water restrictions at a micro level. The county may specify all sprinkler systems 300 to be on connected sprinkler controllers 302 so that the county may micromanage the sprinkler systems 300 so as to not overtax the water that the county provides. The sprinkler systems 300 may automatically handle more complex water restrictions and deliver the proper watering to the county.

A county may be motivated to install systems and provide data because doing so may save them a lot of water. A county may impose water restrictions, but a service provider and a sprinkler system 300 may ensure that those restrictions are followed.

In one example, a county may have a motivation to cooperate, because if the county's water levels drop below some critical environmental factor, the county may need to push out and enforce water restrictions. The sprinkler system 300 may give a county more control or make it easier to ensure compliance with a watering restriction.

In one example embodiment, the county control watering levels almost directly. The county may change the values (e.g., watering restrictions) that the county pushes out. Each sprinkler system 300 may be set up to automatically change a sprinkling schedule based on whatever numbers the county provides to the sprinkler system 300. The sprinkler system 300 may be more effective and cheaper than the county sending a letter to a property owner every three weeks with the latest summer county-water restrictions.

Returning to a discussion of potential zones for a property, a zone may be of a different size. One zone may be a small patch of grass, sideyard, garden, flower bed, or some other area. Another zone may include an entire property, a field, a forest, or some other area. There may be different zones of different sizes, or different zones of the same size.

A zone may have different types of vegetation. There may be more than one type of vegetation within a zone, or multiple zones with the same type of vegetation. In one embodiment, the sprinkler system 300 may apply different criteria for watering different vegetation types. For example, a lawn sprinkler system 300 may have a set of criteria for watering different types of lawn. The lawn may include zoysia grass. The sprinkler system 300 may have one zone that is configured to optimally water zoysia grass. There may be other sprinkler valves 304 connected to a garden that is proximate to a house. The garden sprinkler valves 304 may be associated with a different zone associated with a different profile. In another example, there may be different zones for watering, respectively, a garden, bluegrass, and zoysia grass.

In another example, a zone may include multiple types of vegetation within one zone. For example, a single zone may cover bluegrass, zoysia grass, and a garden. Thus the zones and sprinkler controller 302 may be configured in any number of different ways.

A zone may have a differing amount of sunshine or shade. For example, a zone may include a tree that shades part of the zone. In another example, a zone may be shaded by a house or other structure, such as a deck. Another zone may be exposed to sunshine that is filtered, such as through a sunroof or greenhouse. Another zone may be exposed to direct sunlight. Direct sunlight may have different intensities, such as if a zone is on an eastern part of a zone compared to the northern part of a zone. Therefore a sprinkler controller 302 may adjust a sprinkling schedule based on the differing amounts of sunshine or shade within a zone.

A zone may have a different ambient temperature. For example, a zone may be next to or include a piece of pavement, such as concrete or asphalt, which may trap heat, affecting the temperature in the zone. In another example, a zone may be next to a pond or swimming pool, which may help keep the air in that zone more temperate. In another example, a zone may have a combination of elements within the zone, such as concrete next to a swimming pool. Therefore, the sprinkler controller 302 may adjust a sprinkling schedule based on the ambient temperature within the zone or within parts of the zone.

A zone may have a different amount of wildlife. For example, one zone may always attract local birds, such as hummingbirds or bald eagles. Those zones may have different watering needs, such as if the wildlife drink the water, affecting the amount of water that reaches the vegetation. In another example, a zone may attract deer, such as if there is a garden or prairie grass in the zone. The deer may wish to drink water, cool off in the sprinklers, or even hide from predators in the sun's glare reflected off the sprinklers' spray. In another example, a dog, cat, or other domesticated animal or pet may prefer a certain section of lawn, a particular tree, or a fire hydrant in a zone to urinate or excrete waste. In short, the interest of animal life in a zone may have an effect on the growth of the vegetation within a zone.

A sprinkler controller 302 may respond to the interest of animal life in a zone by adjusting a sprinkling schedule according to the needs of the vegetation within the zone. For example, a sprinkler controller 302 may water more to compensate for animals drinking the water from the sprinkler valves 304. Additionally, a sprinkler controller 302 may water more to dilute animal waste, therefore lessening its effects on grass. Alternatively or additionally, a sprinkler controller 302 may water less to discourage animals or insects from coming to that zone to reap the benefits of the water.

A zone may have different types of terrain. For example, one zone may include a large hill. Another zone may surround a pond or other landscaping feature. A different zone may include rocks, while another zone may be more sandy. A sprinkler controller 302 may adjust a sprinkling schedule in response to a different type of terrain.

Relatedly, a zone may have different soil types. For example, one zone may have soft soil. Another may have extremely hard soil, such as soil that has been hard packed by the sun. A different zone may have been regularly fertilized and tilled, resulting in soft, rich, fertile soil.

A soil type may be measured by one or more different metrics. For example, a metric for measuring soil type may include one or more of precipitation rate, percolation rate, and infiltration rate. One or more of these metrics may be measured in inches per hour.

For example, a sprinkling system may irrigate a lawn where the water may run off the lawn into a gutter or into a low spot before the soil is wet through the root zone. This may be because the sprinkler system may deliver more water in a given amount of time than the soil can absorb. In other words, the precipitation rate of the sprinklers—the rate at which the sprinklers distribute water—may be greater than the infiltration rate of the soil—the rate at which the water infiltrates the soil. Another term for infiltration rate may be percolation rate—the rate at which water percolates into the soil. Another measure may be the saturation coefficient, which may measure how saturated the soil is with moisture.

There may be multiple methods for determining percolation and infiltration rates. For example, the sprinkler system 300 may be provided either with a periodic test of percolation rate, or a moisture sensor 306 that measures percolation rate, which may also be fed from the sprinkler system 300 automatically such that a dynamic percolation rate may be determined. For example, if soil is highly moist or alternatively is hard-packed (e.g., by the sun), the percolation rate may be substantially less than when soil is at normal moisture. A moisture sensor 306 may also include a percolation sensor that gathers percolation data based on predicted percolation, soil type, location, or environmental conditions at the time. A moisture sensor 306 may also detect root depth, as well as soil saturation through the root zone. For example, a sensor 306 may detect soil saturation above the base of the roots, at the base of the roots, or below the base of the roots.

In one embodiment, there may be a moisture sensor 306 on a garden; a moisture sensor 306 on a backyard, which may get southern sun; a moisture sensor 306 on a sideyard, which may be shaded; and a moisture sensor 306 on a front yard, which may get northern sun. Each area may have one or more different moisture sensors 306, with potentially different moisture content. An area may be associated with a zone, as discussed above.

In one approach to solve the problem of water runoff where the precipitation rate is greater than the infiltration rate, the sprinkler system 300 may include one or more sensors (e.g., moisture sensor 306) that detect when water starts to run off, and automatically shut off the sprinkler valves 304 in response to detecting that the water is running off. Alternatively or additionally, the sprinkler system 300 may include one or more moisture sensors 306 to detect that the precipitation rate is higher than the infiltration rate. The sprinkler controller 302 may pause water delivery for a time, then start water delivery again until there is run off again. The sprinkler controller 302 may continue the run-stop-wait-run cycle until the soil is saturated through the root zone. In other words, this may be described as cycling the sprinklers.

In one example, a technician or user may test different zones in a location to determine permeability, grass type, type of area being watered, such as garden, Bermuda grass, blue grass, flower beds, etc. The technician may make a determination as to the permeability of the ground in a particular zone. This information can be coded into the sprinkler controller 302, and an optimum watering profile can be applied to the particular zone based on the measurements, or based on past experience.

A service provider may establish test lawns that have certain sensors or are periodically tested by technicians so as to deliver the optimal level of watering or other control to achieve the healthiest and best lawns possible within the watering constraints or regulations currently being applied. A test lawn may be a customer's property, or may be a lawn or area maintained at a service-provider-owned location.

A watering profile may use ground-permeability information to water an area, detect ground moisture levels, and water again in a feedback loop until an optimum watering condition is obtained. For example, the sprinkler controller 302 may determine that, rather than water for 60 minutes straight, it may be more effective to water for 30 minutes, wait 60 minutes, then water again for 30 minutes. Such an approach may maximize watering and minimize runoff within a particular zone, depending on the permeability of the soil within that zone.

In a location with county or other watering restrictions in place, the sprinkler controller 302 may cycle the sprinkler valves 304 in accordance with a total watering restriction to maximize the effect of the allowed water. For example, if a county allows a property to water for 60 minutes per day, the sprinkler system 300 may water for 20 minutes then wait 30 minutes, three times. Thus there may be a total of 60 minutes of watering, with the additional benefit of minimizing or eliminating water runoff by cycling the sprinkler. Additional details of how a sprinkler controller 302 may comply with a watering restriction are described later.

In another approach to solve the problem of water runoff, the sprinkler system 300 may use a moisture sensor 306. For example, instead of watering for a fixed time, the sprinkler system 300 may water until the saturation coefficient is reached, as detected by a moisture sensor 306, then stop watering. The sprinkler system 300 may wait a period of time, then water again until the saturation coefficient is reached again, again as measured by moisture sensor 306. Thus the sprinkler system 300 may cycle watering while avoiding oversaturation to maximize the benefit of watering.

Alternatively or additionally, if within a particular area there is more or less drainage, the sprinkler system 300 may record past watering information—such as the amount of runoff, infiltration, percolation, saturation, or some other measure—to adjust a current or future sprinkling schedule.

Alternatively or additionally, the sprinkler controller 302 may upload moisture data from one or more moisture sensors 306 to a server 314. The server 314 may be affiliated with a service provider, a county or other entity, or some other source.

The sprinkler controller 302 may upload data according to a regular schedule, such as hourly, daily, weekly, or a different time period. Alternatively or additionally, the sprinkler controller 302 may upload data in response to a manually-entered user command to upload data.

Alternatively or additionally, the sprinkler controller 302 may receive a request from a server 314 requesting the moisture information for the property sprinkled by the sprinkler system 300, or a part of the property. The server 314 may request the data according to a regular schedule, such as every ten minutes, every hour, every day, or some other schedule. Alternatively or additionally, the server 314 may request the data manually, or on an irregular or a one-time basis.

In some configurations, the sprinkler controller 302 may not have a regular network connection. If the sprinkler controller 302 attempts to upload information to a server 314, and there is not an available network connection, the sprinkler controller 302 may store the information for later upload. In another example, if there is a connection but it is weak, or for some other reason the sprinkler controller 302 fails to properly upload the information, the sprinkler controller 302 may store the information for later upload. In some embodiments, the data may be stored for a finite period of time. For example, a sprinkler controller 302 may only upload moisture information that is a certain age or less, such as the most recent 24 or 48 hours.

Alternatively or additionally, the sprinkler controller 302 may be connected to a network 210 directly, or may be connected to a network indirectly through a network hub 318. For example, the network hub 318 may include a switch, router, or gateway.

In one embodiment, the sprinkler system 300 may eliminate the need for sensor hardware, such as moisture sensors 306 or rainfall sensors 312. In one example, a county or other weather database may provide actual rainfall percentages for a particular area, so a sprinkler controller 302 in that area may not need a moisture sensor 306, which may be expensive, in its own sprinkler system 300.

In another example, a potential use for uploaded moisture information may include the server 314 extrapolating the moisture information for another area without its own moisture information. For example, a county weather station may regularly receive from another source moisture information for all or some parts of a county, such as from its own moisture sensors, weather stations, or from a weather service. In one example, that information may sometimes be incomplete for one or more parts of a county, such as if a moisture sensor failed or a weather station may not capture or transfer the moisture information. In one example, the server 314 may collect moisture information from individual controllers with associated moisture sensors. The server 314 may use the collected or uploaded moisture information to replace or supplement its other moisture information.

In another example, the server 314 may always collect moisture information from each sprinkler controller 302, and aggregate that information with moisture information received from other sources. In another example, a service provider may collect moisture information from different individual sprinkler controllers 302 with affiliated moisture sensors 306, then sell the moisture information to other service providers, to a county or other entity, or some other entity. The service provider may use the collected moisture information for use in the service provider's own weather service or website.

A service provider may collect or maintain location information for a particular property. For example, a service provider may collect or store a property's address, longitude-latitude, GPS coordinate, or other geographical identifying information about a property. A service provider may collect location information when the user signs up for service, or at another time.

In the case of a service provider receiving moisture information from a sprinkler controller 302 with associated moisture sensors 306, the service provider may also receive location information affiliated with that sprinkler controller 302 or even the individual moisture sensor 306 that collected the moisture information. For example, the location information may include GPS coordinates, latitude and longitude, or some other location information.

A service provider may use moisture information in combination with location information to map moisture to the geographic location, such as the longitude and latitude. The service provider may determine other users within a certain distance of that user, such as 100 feet, 500 feet, 1000 feet, a quarter mile, or some other distance. The service provider may extrapolate data to use for other users on various sides of the user whose home watering levels are currently being monitored by sprinkler systems 300. From another perspective, a service provider may make a projection of the soil moisture content of a sensor-free lawn based on adjacent lawns with sensors 306.

The service provider may use collected moisture information for sending out watering information, logic, or instructions to other sprinkler controllers 302 than those that submitted the information. The service provider may also send out the collected moisture information directly to other sprinkler controllers 302. In one example, a server 314 may only transmit moisture information to sprinkler controllers 302 without moisture sensors 306. Alternatively or additionally, a server 314 may optionally have a sprinkler controller 302 to upload its own moisture information in order to receive moisture information collected from other sprinkler controllers 302.

Alternatively or additionally, a sprinkler controller 302 may receive moisture information directly from other sprinkler controllers 302. For example, a sprinkler controller 302 may connect wirelessly or over a wired connection with a sprinkler controller 302 for another part of the same property, or with a sprinkler controller 302 for a next-door or other neighboring property, or a sprinkler controller 302 for a different property, and receive, send, or exchange moisture information.

A sprinkler controller 302 may use moisture information collected by one or more other sprinkler controllers 302 to determine its own watering schedule. For example, if a first sprinkler controller 302 associated with a first property does not have moisture sensors 306, but a second sprinkler controller 302 associated with a second property does have moisture sensors 306, the first property neighboring the second property, the first sprinkler controller 302 may use moisture information collected by the second sprinkler controller 302 for determining a watering schedule for the first property. In this way, a property's sprinkler system 300 may determine its sprinkling schedule using moisture information collected by its neighbor's moisture sensors 306.

A sprinkler controller 302 may use weather information to adjust a sprinkler schedule. Different weather information may come from accessing a web site—for example weatherdata.com—or another local weather station local to the user's home. For example, if the user is close to an airport that has a weather station, the sprinkler system 300 may use data from the airport weather station. Or the sprinkler system 300 may buy weather data from a database, sort the database based on geographic location, or based on longitude/latitude, using location information a service provider may already have for each user. A service provider may correlate the weather location information with the sprinkler controller's 302 current location, and download that information into the sprinkler controller 302, which may operate the sprinklers 304 based on that information.

The sprinkler system 300 may accommodate forecasting or weather predictions. For example, the sprinkler system 300 may look at both the chance of precipitation and the amount of precipitation from a standardized database, such as weather.com. Both may be variable. For example, if the chance of precipitation is 50% for 6 inches of rain, the sprinkler system 300 may not water. In another example, if the chance of precipitation is 90% for 3 inches of rain, the sprinkler system 300 may not water. In another example, if the chance of precipitation is 95% for ½ inch of rain, the sprinkler system 300 may still water. In summary, both the overall chance of precipitation and the amount of rain can be adjustable and variable within ranges.

The logic can come down from a centralized station like weather.com. The logic can also come from more sophisticated sources, such as exact rain reporting in the path of the storm in order to anticipate the rain that may fall in the near future in the storm's path. One embodiment may use a standardized weather prediction database to populate the information into the sprinkler controller 302.

The sprinkler controller 302 may also include a set of logic for after the rain has passed and the precipitation percentage has dropped. For example, there may have been predicted rain, but no actual precipitation. In other words, the prediction may have been false or incorrect. In that case, the logic may reset the sprinkler controller 302 either based on a soil moisture measure or based on another record of what actually happened during the day. The sprinkler controller 302 may then increase watering the next day based on what actually happened the day before—no precipitation—instead of what was predicted to happen.

The sprinkler controller 302 may perform maintenance based on weather forecast information. For example, a weather forecast may indicate that the temperature for several days may include freezing conditions, such as below 32° Fahrenheit. In such conditions, sprinkler pipes may freeze and burst. The sprinkler controller 302 may include automated controls from maintenance, such as a built-in blowout system that can send compressed air through the sprinkler pipes to clear the water out of them to prevent freezing in cold conditions. The sprinkler controller 302 may automatically activate or run the blowout system when weather-forecast information includes freezing conditions.

In another example, the sprinkler system 300 may include sensors that indicate when a part of the sprinkler system 300 is damaged. For example, a sprinkler valve 304 may have a sensor that indicates when there is a crack or other defect in the sprinkler valve 304. The sprinkler controller 302 may collect sensor information on a periodic basis, or on a manual or as-needed basis. For example, if the weather forecast indicates that there is a heat wave, such as extremely hot weather conditions, the sprinkler controller 302 may collect or analyze sensor information to detect if there is any damage to the sprinkler system 300, such as if a sprinkler valve 304 cracked due to extreme heat. Alternatively or additionally, the sprinkler system 300 may alert the user or otherwise wait for a prompt to run a maintenance cycle, such as blowing out the pipes. In this way, the sprinkler system 300 can automatically detect and prevent damage to the sprinkler system 300 by using the weather forecast.

A sprinkler system 300 may also include one or more user interfaces 316. A user interface 316 may be separate from the sprinkler controller 302, which may include its own display. In one embodiment, a user interface 316 may include a website or mobile-device application (e.g., smartphone or tablet app). Alternatively or additionally, a user interface 316 may include an email or SMS message. Alternatively or additionally, a user interface 316 may include a mobile phone, a cable box interface, a home-security device, on a computer via a web interface that interacts with a service provider system or the local control system, or another interface.

A user interface 316 may allow a user to interact with the sprinkler system 300. For example, the user interface 316 may provide the user the ability to modify settings via the user interface 316.

The sprinkler system 300 may be integrated with one or more other systems for a property. For example, the interface for controlling the sprinkler system 300 may be the same interface used for controlling other default options such as heating, cooling, security, and other home-related options.

The sprinkler system 300 may generate or send user notifications. Notifications may be on a phone, tablet, computer, or other device. Notifications or warnings may relate to certain irrigation-related events, such as new water restrictions, freeze conditions, when the user should blow out pipes in order to prevent them from freezing, or any other types of suitable notification for the user.

The sprinkler system 300 may also provide SMS messages, phone alerts, AMBER alerts, email, or another type of notification to users in high vulnerability areas. The notification may include guidance on what to do to remain safe. The fire department may also issue notifications to users, informing users of what to do in different weather or soil-moisture conditions.

In addition, an application ("app") may be provided on a user's phone that provides a graphical interface that shows current moisture levels of the soil, and the different moisture levels of different zones. The app may look at predicted moisture levels based on watering v. actual moisture levels based on the user's home or a neighbor's home adjacent to the user's home. The app may allow the user to override or change certain parameters to increase or decrease watering based on those parameters. The app may allow the user to view service-provider recommended watering based on predictions of upcoming weather events or past moisture events. The app may allow user to control user's own sprinkler schedule or to override a sprinkler schedule.

The app may indicate what settings violate a watering restriction (e.g., county regulation). A user may be warned or even prevented from violating a watering restriction. Alternatively or additionally, a sprinkler controller 302 may allow a user to set a sprinkling schedule that violates a watering restriction. Alternatively or additionally, a sprinkler controller 302 may automatically report watering-restriction violations to a county or other restriction-issuing entity.

Additional support may be provided for a user who is experiencing problems. For example, watering options or profiles may be modified remotely (e.g., via server 314) for a user based on questions or concerns regarding the current watering profiles or sprinkler schedules being provided.

The sprinkler system 300 may be integrated into a security system database associated with fire and police call information. This information may provide location-specific data for phone calls and security-system information for the user. The current soil conditions and weather conditions in that location can be provided into that database.

The sprinkler system 300 can also provide information to the fire dept. For example, the sprinkler system 300 may provide to the fire department information regarding extremely dry conditions in California. The sprinkler system 300 may also provide a fire department with information regarding areas with a particularly high vulnerability to fires (e.g., due to dry conditions).

Alternatively or additionally, a sprinkler controller 302 may be basic, configured to perform basic functionality, such as only to receive or store a sprinkling schedule from a centralized server 314. After receiving a sprinkling schedule from the server 314, the sprinkler controller 302 may operate the sprinkler valves 304 in accordance with the sprinkling schedule received from the server 314. For example, the sprinkler controller 302 may simply be a single application-specific integrated circuit (ASIC), controller, or even more simply a logic circuit with non-volatile periodically updated memory with all of the maintenance, interface, and control functions being centralized in the server. In this manner, the incremental cost of the individual sprinkler control system may be minimized, while a sophisticated sprinkler control system may be provided to many homes with a small incremental cost. In this embodiment, the server 314 may receive any or all of the information described herein (e.g., weather information, moisture information, etc.) as being sent to the sprinkler controller 302, use the information for creating or adjusting a sprinkling schedule, and send the sprinkling schedule to the sprinkler controller 302. A server-created sprinkling schedule may be property specific (e.g., linked to the individual sprinkler controller 302), or may be applied to more than one property (e.g., applied to all the homes on a block or a street). Alternatively or additionally, a server-created sprinkling schedule may implement zones for a specific property, sending to a sprinkler controller 302 a sprinkling schedule that waters specific zones in the property associated with the sprinkler controller 302.

Figure 4:
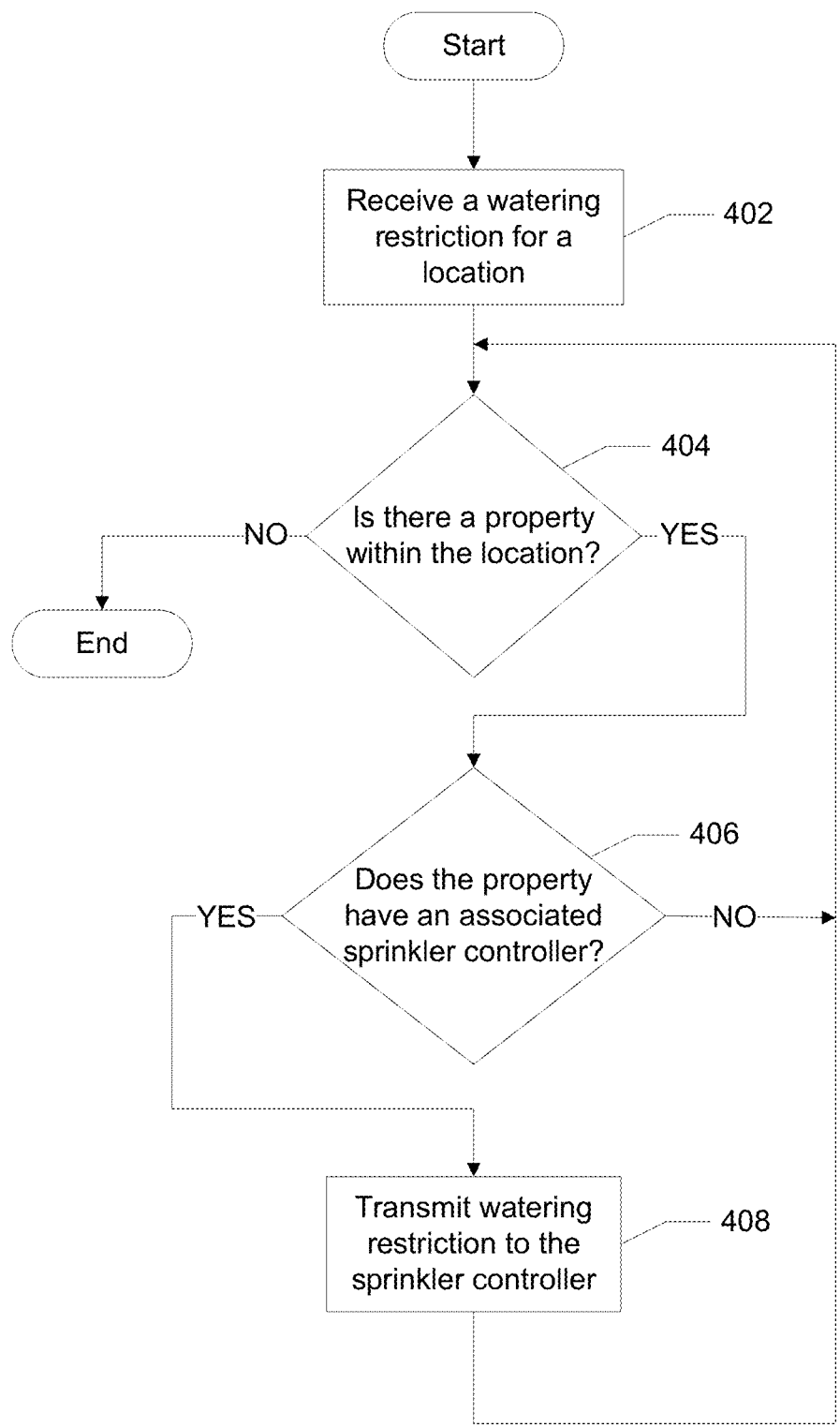
FIG. 4 illustrates an example process for a server to receive a watering restriction and transmit it to a sprinkler controller.

FIG. 4 illustrates an example process for a server to receive a watering restriction and transmit it to a sprinkler controller.

In step 402, the server may receive a watering restriction for a location. As discussed above, the watering restriction may be issued by a governing entity associated with the location, such as a county.

In step 404, the server may determine if there is a property within the location. For example, the server may check if there is a property within the county covered by the watering restriction received in step 402. If there is not a property within the location, the method may end. As discussed above, the location may be more specific than simply a county. For example, if the watering restriction applies to properties with even street numbers, the server may determine whether the property has an even street number. If there is a property, the method continues to step 406.

Alternatively or additionally, the server may skip the step of determining if there is a property within the location, and simply transmit the watering restriction to one or more sprinkler controllers that the server has information for. Each sprinkler controller then may determine if the watering restriction is applicable to the property associated with that sprinkler controller. Alternatively or additionally, there may be multiple filters for a watering restriction, performed by one or more devices. For example, a server may make an additional determination, such as determining if a property is within a location such as a county, and then the sprinkler controller performs an additional determination or check, such as determining if there is an additional restriction on the watering restriction (e.g., the watering restriction is applicable only to an even or odd street address).

In step 406, the server may determine if the property has an associated sprinkler controller. If the property does not have an associated sprinkler controller, the method may return to step 404 to determine if there is an additional property within the location. If the property does have an associated sprinkler controller, the method may continue to step 408.

In step 408, the server may transmit the watering restriction to the sprinkler controller associated with the property. For example, the server may transmit the county watering restriction to the property with an associated sprinkler controller, the property located within the county.

After transmitting the watering restriction to the sprinkler controller associated with the property, the method may return to step 404 to determine if there is an additional property within the location.

Figure 5:
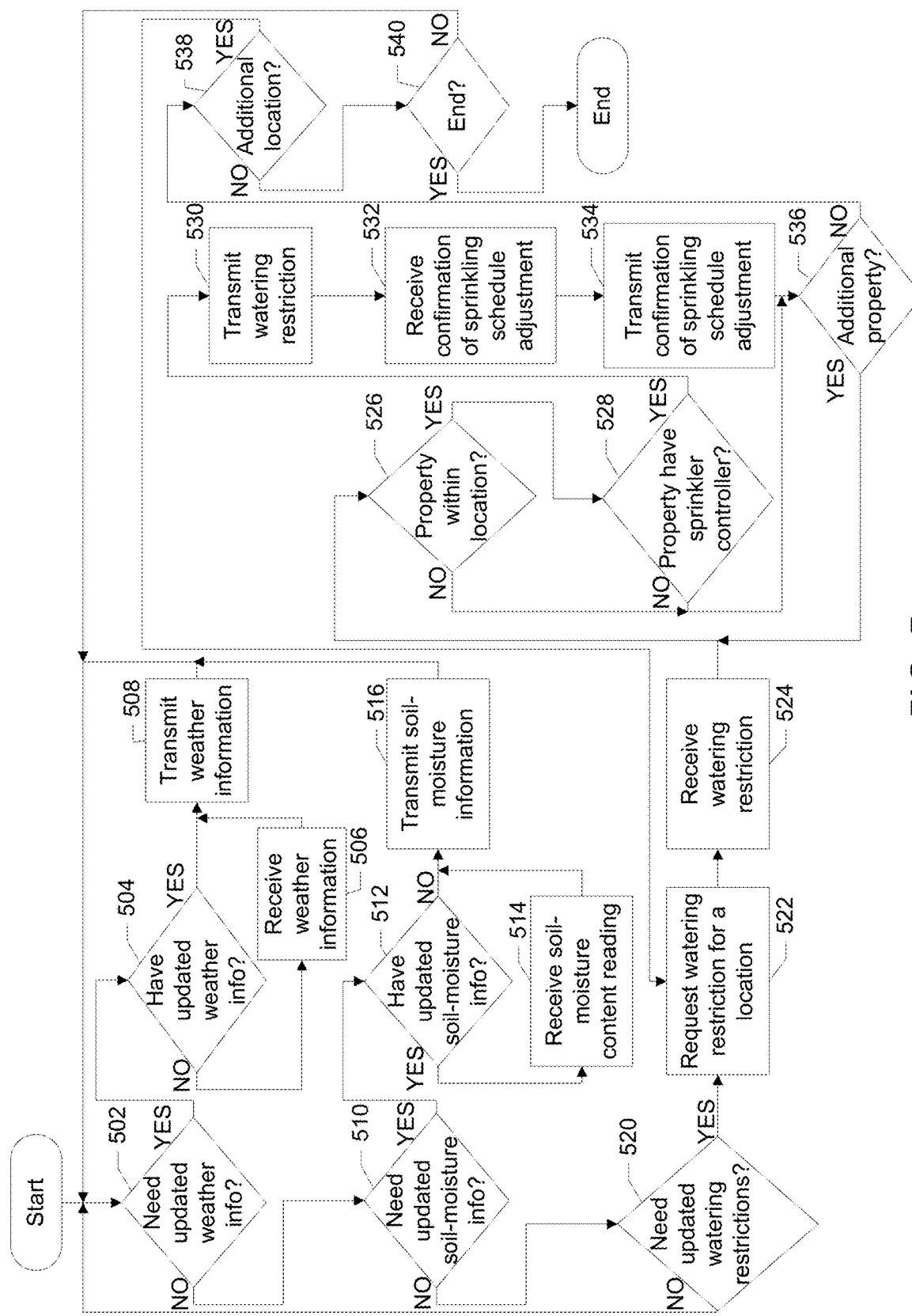
FIG. 5 illustrates an example process for a server to interact with a sprinkler controller.

FIG. 5 illustrates an example process for a server to interact with a sprinkler controller.

In step 502, the server may determine if a sprinkler controller needs updated weather information. If the sprinkler controller needs updated weather information, then in step 504 the server may check if the server has updated weather information. If the server has updated weather information, in step 508 the server may transmit the updated weather information to the sprinkler controller. If in step 504 the server does not have updated weather information, in step 506 the server may receive updated weather information for the location. For example, the server may receive updated weather information from a weather service, a weather station, another sprinkler controller nearby the property associated with the sprinkler controller needing updated weather information, or another source. After receiving updated weather information, the server in step 508 may transmit the updated weather information to the sprinkler controller. The sprinkler controller may respond to the weather information by adjusting a sprinkling schedule for the property. After transmitting the updated weather information to the sprinkler controller, the server may return to step 502.

If in step 502 the server does not need updated weather information, in step 510 the server may determine if a sprinkler controller needs updated soil-moisture information. For example, as described above, a sprinkler controller may not have an associated soil-moisture sensor. The server may set a timer, a flag, or another indication that the sprinkler controller may need updated soil-moisture information. Alternatively or additionally, the sprinkler controller may request updated soil-moisture information. If the server does not need updated soil-moisture information, the server may go to step 520. If the sprinkler controller needs updated soil-moisture information, the server may go to step 512.

In step 512, the server may check if the server has updated soil-moisture information for the property associated with the sprinkler controller. For example, the server may have information, but the information may be stale or out of date.

In another example, the server may have current information, but not for the property associated with the sprinkler controller. In one embodiment, the server may not have soil-moisture information for the property associated with the sprinkler controller, but may have soil-moisture information for a property nearby the property associated with the sprinkler controller. The server may determine if the two properties are close enough to have a likelihood of similar soil-moisture information. For example, if the server has soil-moisture information for a property next to the property associated with the sprinkler controller, the server may determine that the soil-moisture information is relevant to the sprinkler controller. By contrast, if the server only has soil-moisture information associated with, for example, a property a long distance away from the property associated with the sprinkler controller, the server may determine that the soil-moisture information is not relevant to the sprinkler controller. Alternatively or additionally, the server may have soil-moisture information for a region (e.g., a county), and may determine whether the property associated with the sprinkler controller is near or within the region.

If the server does not have updated soil-moisture information, it may in step 514 receive an updated soil-moisture content reading. For example, the server may request and receive a soil-moisture content reading from a different sprinkler controller associated with a different property within the location. The different property may be nearby the property associated with the sprinkler controller in need of updated soil-moisture information. In another example, the server may request updated soil-moisture information from another source, such as a county portal, a weather database, or another service.

If the server has updated soil-moisture information in step 512, or after the server receives updated soil-moisture information in step 514, the server may determine that a distance from the different property (that the server received the soil-moisture content reading from) to the property falls within a threshold. In step 516, the server may transmit, to the sprinkler controller, the soil-moisture content reading from the different sprinkler controller.

The sprinkler controller may respond to the soil-moisture content reading by adjusting a sprinkling schedule for the property. In one embodiment, adjusting the sprinkling schedule for the property may include comparing a soil type for the property and a soil type for the different property. Alternatively or additionally, a result of the comparison may impact the sprinkling schedule for the property. Alternatively or additionally, the soil type for the property or the soil type for the different property may include at least one of a percolation rate, a precipitation rate, and an infiltration rate.

The server may, after transmitting the updated soil-moisture content information, return to step 502. As mentioned earlier, if the server in step 510 determined that the sprinkler controller did not need updated soil-moisture information, the server may go to step 520.

In step 520, the server may determine if the server needs updated watering restrictions. For example, the server may have a timeline to follow for receiving update watering restrictions (e.g., daily, weekly, monthly, etc.). Alternatively or additionally, the server may use another method for tracking whether it needs updated watering restrictions (e.g., using a cookie that expires, setting a timer, using a tracking code that tracks when the last update was requested or received, or another method). If the server determines that it does not need updated watering restrictions (e.g., the server already has up-to-date watering restrictions), the server returns to step 502. In one embodiment—not shown—if the server does not need updated watering restrictions, the method ends.

If the server in step 520 needs updated watering restrictions, then in step 522 the server requests updated watering restrictions for a location. For example, the server may communicate with another server, a county portal, or another service or device to request updated watering restrictions for a location. In another example, the server may request the watering restriction for the location from a different computing device. In another example, the entity that issues the watering restriction for the location may communicate with the different computing device to provide the watering restriction. In step 524, the server receives updated watering restrictions for a location. Alternatively or additionally, the server may receive a notification that there is not an updated watering restriction available, in which case the method may end or may return to step 502.

After receiving updated watering restrictions for a location, the server in step 526 determines if there are any properties within the location. For example, the server may maintain or access a list of subscribers to a service provided by an entity maintaining the server (e.g., a cable-service provider, home-security provider, Internet-service provider, etc.). There may be associated with the subscriber an address for a property. If the server determines the property is not within the location (e.g., the address is not within a county that the watering restriction is for), the server may go to step 536. If the property is within the location (e.g., the address is within a county that the watering restriction is for), the server may continue to step 528.

In step 528, the server may determine if the property has an associated sprinkler controller. For example, the server may determine that there is a property that is within the location but without a sprinkler controller (e.g., a cable subscriber lives in the county that issued the watering restriction, but the cable subscriber does not have an automated sprinkling system or a sprinkler controller). The server therefore may go to step 536. If the server determines the property within the location has an associated sprinkler controller, the server may go to step 530.

In step 530, the server may transmit the watering restriction to the sprinkler controller. The sprinkler controller may transmit a confirmation that the sprinkler controller received the watering restriction.

The sprinkler controller may respond to the watering restriction by adjusting a sprinkling schedule for the property. The sprinkler controller may transmit confirmation that the sprinkler controller associated with the property responded to the watering restriction by adjusting the sprinkling schedule for the property. In step 532, the server may receive confirmation that the sprinkler controller associated with the property responded to the watering restriction by adjusting the sprinkling schedule for the property. In step 534, the server may transmit, to an entity issuing the watering restriction, the confirmation. In one embodiment, the entity issuing the watering restriction may charge a lower water rate for the property in response to the confirmation.

In one example, the location may include a county, and the watering restriction may include a county-specific watering restriction. For example, the watering restriction may include a county-wide watering restriction.

In step 536, the server may determine if there is an additional property. For example, if the watering restriction is a county-wide watering restriction, the server may check if there is an additional property within the county. If there is an additional property, the server may return to step 526. If there is not an additional property (e.g., the server already transmitted to all the sprinkler controllers associated with properties within the location), the server may go to step 538.

In step 538, the server may determine if there is an additional location. For example, a county may issue watering restrictions for part of the county. Therefore, the location may be the part of the county covered by the watering restriction. In other words, the location may include a subsection of a county and a different location may include a different subsection of the county. The server may, in step 538, check if there is an additional watering restriction related to a different part of the county. If there is an additional location, the server may return to step 522. If there is not an additional location, the server may go to step 540.

After returning to step 522, the server may in step 524 receive a different watering restriction for a different location. The server may in steps 526, 528 detect that a different sprinkler controller is associated with a different property within the different location. The server may in step 530 transmit, to the different sprinkler controller, the different watering restriction.

Returning to step 540, the server may determine if the method is to end. For example, the server may determine that all of the sprinkler controllers for all of the properties associated with the server are up to date, and therefore the method may end or be paused temporarily. If the method is not to end, the server may return to step 502.

Figure 6:
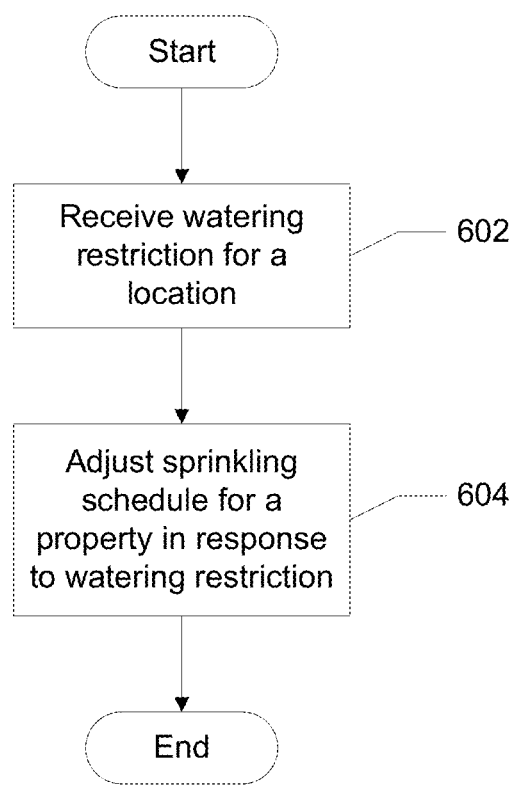
FIG. 6 illustrates an example process for a sprinkler controller to receive and process a watering restriction.

FIG. 6 illustrates an example process for a sprinkler controller to receive and process a watering restriction.

In step 602, a sprinkler controller may receive a watering restriction for a location. As discussed above, the sprinkler controller may be associated with a property within the location. In one embodiment, the sprinkler controller may do a check to determine if the watering restriction applies to the property. Alternatively, the sprinkler controller may not do a verification check to determine if the watering restriction applies to the property.

In step 604, a sprinkler controller may adjust a sprinkling schedule for a property in response to the watering restriction. As discussed above, the sprinkling schedule may be adjusted in any number of ways. For example, the sprinkler controller may adjust the sprinkling schedule to limit sprinkling to certain times of the day in accordance with the watering restriction.

Figure 7:
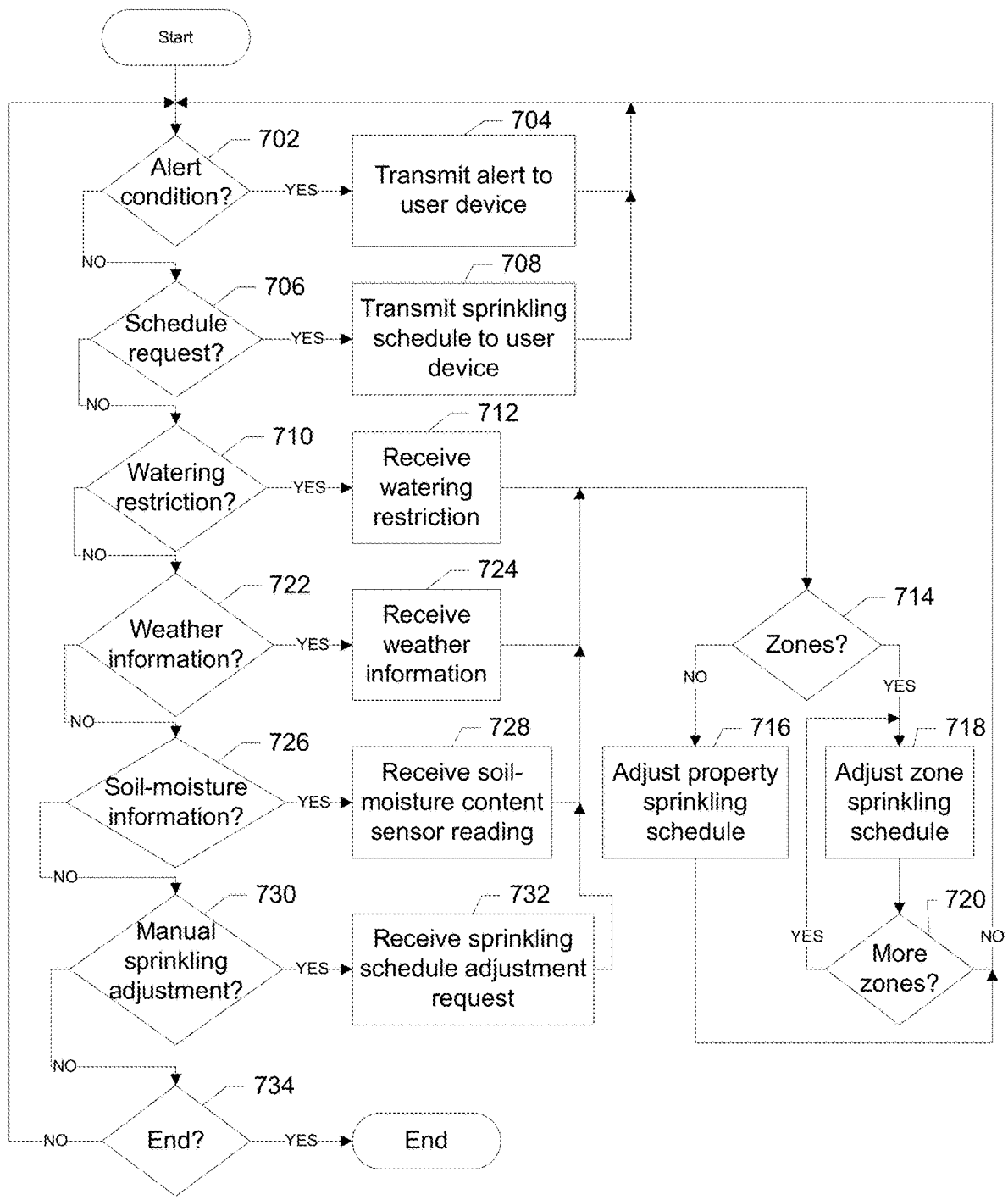
FIG. 7 illustrates an example process for a sprinkler controller to manage a property's sprinkling schedule.

FIG. 7 illustrates an example process for a sprinkler controller to manage a property's watering schedule.

In step 702, the sprinkler controller may determine if an alert condition is present. For example, the sprinkler controller may be set to alert the user every time the sprinkling schedule changes. For example, the sprinkler controller may change the sprinkling schedule in response to receiving a new watering restriction.

In step 704, the sprinkler controller may transmit, to a user device, an alert associated with the sprinkling schedule for the property. For example, the sprinkler controller may send an alert to a user device that the sprinkling schedule changed in response to receiving a new watering restriction. After transmitting the alert to the user device, the sprinkler controller may return to step 702.

If there is no alert in step 702, the sprinkler controller may in step 706 determine if a user device requested the sprinkling schedule for the property. In step 708, the sprinkler controller may transmit the sprinkling schedule to the user device. The sprinkler controller may then return to step 702. If there is not a schedule request pending, the sprinkler controller may go to step 710.

In step 710, the sprinkler controller may determine if there is a watering restriction for the property, or if a new watering restriction for the property is needed. For example, the sprinkler controller may have a watering restriction, but the watering restriction may be old. It may be desirable to avoid complying with an outdated or superseded watering restriction. If there is not a need for a new watering restriction, the sprinkler controller may go to step 722. If there is a need for a new watering restriction, in one embodiment, the sprinkler controller may request from a server a new watering restriction. If the server determines a new watering restriction is available, the server may transmit, and in step 712 the sprinkler controller receive, a watering restriction for a location, the sprinkler controller associated with a property within the location.

In step 714, the sprinkler controller may determine if there are zones associated with the property. If there are not zones associated with the property, in step 716 the sprinkler controller may adjust, in response to the watering restriction, a sprinkling schedule for the property. After adjusting the sprinkling schedule in step 716, the sprinkler controller may return to step 702.

If there are zones associated with the property, in step 718 the sprinkler controller may adjust, in response to the watering restriction, a sprinkling schedule for the zone of the property. In step 720, the sprinkler controller may determine if there are additional zones on the property that have not adjusted their sprinkling schedules in response to the watering restriction. If there are additional zones, the sprinkler controller may return to step 718. After returning to step 718, the sprinkler controller may adjust a different sprinkling schedule for the property. In another example, the sprinkling schedule may be associated with a zone of the property and the different sprinkling schedule may be associated with a different zone of the property.

If in step 720 there are not additional zones—e.g., the sprinkler controller adjusted all the zones—the sprinkler controller may return to step 702.

Returning to step 722, the sprinkler controller may determine if there is a need for updated weather information. If not, the sprinkler controller may go to step 726. If there is a need for updated weather information, the sprinkler controller may in step 724 receive weather information for the property. The sprinkler controller may then go to steps 714-720, where the sprinkler controller follows substantially the same steps as described above in connection with steps 714-720, except the sprinkler controller may adjust the sprinkling schedule in response to the weather information.

In one exemplary embodiment of steps 722-724, and 714-720, a computing device (e.g., a sprinkler controller), may receive weather prediction information associated with a property. The computing device may update, in response to the weather prediction information, a sprinkling schedule for a sprinkler system associated with the property. The computing device may receive, after a time period, updated weather prediction information for the property. The computing device may update the sprinkling schedule based on a comparison between the sprinkling schedule and the weather prediction information over the time period. Alternatively or additionally, the comparison may include determining that the sprinkling schedule was adjusted to compensate for the weather prediction information. Alternatively or additionally, the updated weather prediction information may indicate that actual weather was different than predicted weather Returning to step 726, the sprinkler controller may determine if there is a need for updated soil-moisture information. If there is not a need, then the sprinkler controller may go to step 730. If there is a need, the sprinkler controller may request updated soil-moisture information from a server, a neighboring sprinkler controller, a soil-moisture sensor attached to the sprinkler system associated with the sprinkler controller, or another source. In step 728, the sprinkler controller may receive updated soil-moisture content information. The sprinkler controller may then go to steps 714-720, where the sprinkler controller follows substantially the same steps as described above in connection with steps 714-720, except the sprinkler controller may adjust the sprinkling schedule in response to the soil-moisture content information.

Returning to step 730, the sprinkler controller may determine if there is a manual sprinkling-adjustment request (e.g., from a user device). For example, a user may manually adjust the sprinkling schedule using a device or other interface (e.g., sprinkler controller display and buttons, smartphone, tablet, website, etc.). In step 732, the sprinkler controller may receive the sprinkling-schedule adjustment request. The sprinkler controller may then go to steps 714-720, where the sprinkler controller follows substantially the same steps as described above in connection with steps 714-720, except the sprinkler controller may adjust the sprinkling schedule in response to the manual sprinkling-schedule adjustment request.

If there is not a manual adjustment request, the sprinkler controller in step 734 may determine if the adjustment process is to end. For example, the sprinkler controller may run through the logic every so many clock cycles. If the sufficient number of clock cycles have passed, the logic may restart at step 702. Alternatively or additionally, there may be some other trigger or reason to return to step 702. Otherwise, the method may end.

Figure 8:
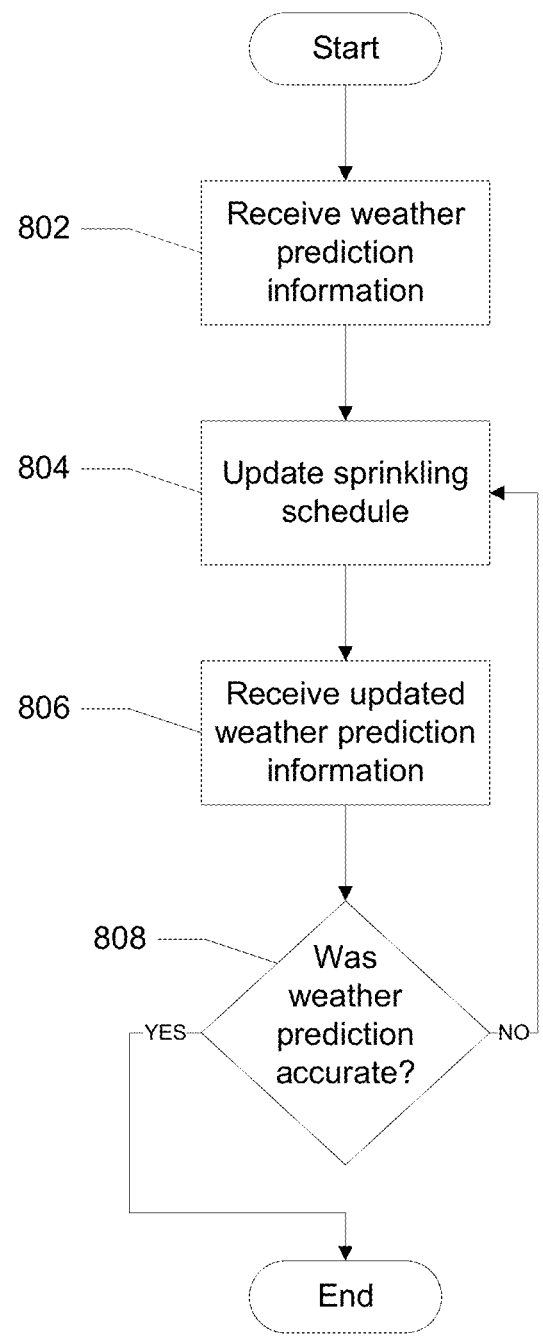
FIG. 8 illustrates an example process for a sprinkler controller to receive and process weather prediction information.

FIG. 8 illustrates an example process for a sprinkler controller to receive and process weather prediction information.

In step 802, the sprinkler controller may receive weather-prediction information. For example, the sprinkler controller may receive weather-prediction information for a location (e.g., a county).

In step 804, the sprinkler controller may update its sprinkling schedule. For example, the sprinkler controller may update the sprinkling schedule in response to the weather-prediction information. For example, the weather-prediction information may include a prediction that there will be heavy rain in the location for the next two days. Therefore the sprinkler controller may adjust the sprinkler controller to not water for the next two days.

In step 806, the sprinkler controller may receive updated weather-prediction information. For example, two days after receiving the weather-prediction information in step 802, the sprinkler controller may receive updated weather-prediction information for the next two days (days three and four after step 802). The updated weather-prediction information may include actual weather information. For example, the updated information may include what actually happened weather-wise on the two days after the initial weather-prediction information was received (i.e., what happened on the days covered by the initial weather-prediction information).

In step 808, the sprinkler controller may determine if the weather prediction received in step 802 was accurate. For example, the weather-prediction information received in step 802 may have indicated that there would be heavy rain for the next two days, and then there was heavy rain for two days. If the weather prediction was accurate, the process may end.

The sprinkler controller may, however, determine the weather prediction received in step 802 was not accurate. For example the weather prediction received in step 802 may have indicated that there may be heavy rain over the next two days. But it may turn out that there was no rain over the predicted time period. If that is the case, the sprinkler controller may return to step 804 and update the sprinkling schedule. The sprinkler controller may compensate for the sprinkling schedule adjusted in response to the weather-prediction information. For example, if the sprinkling schedule was reduced because rain was predicted, but no rain came, the sprinkling schedule may be increased above its normal level for a day or two to compensate for the missed watering over the predicted time period.

Figure 9:
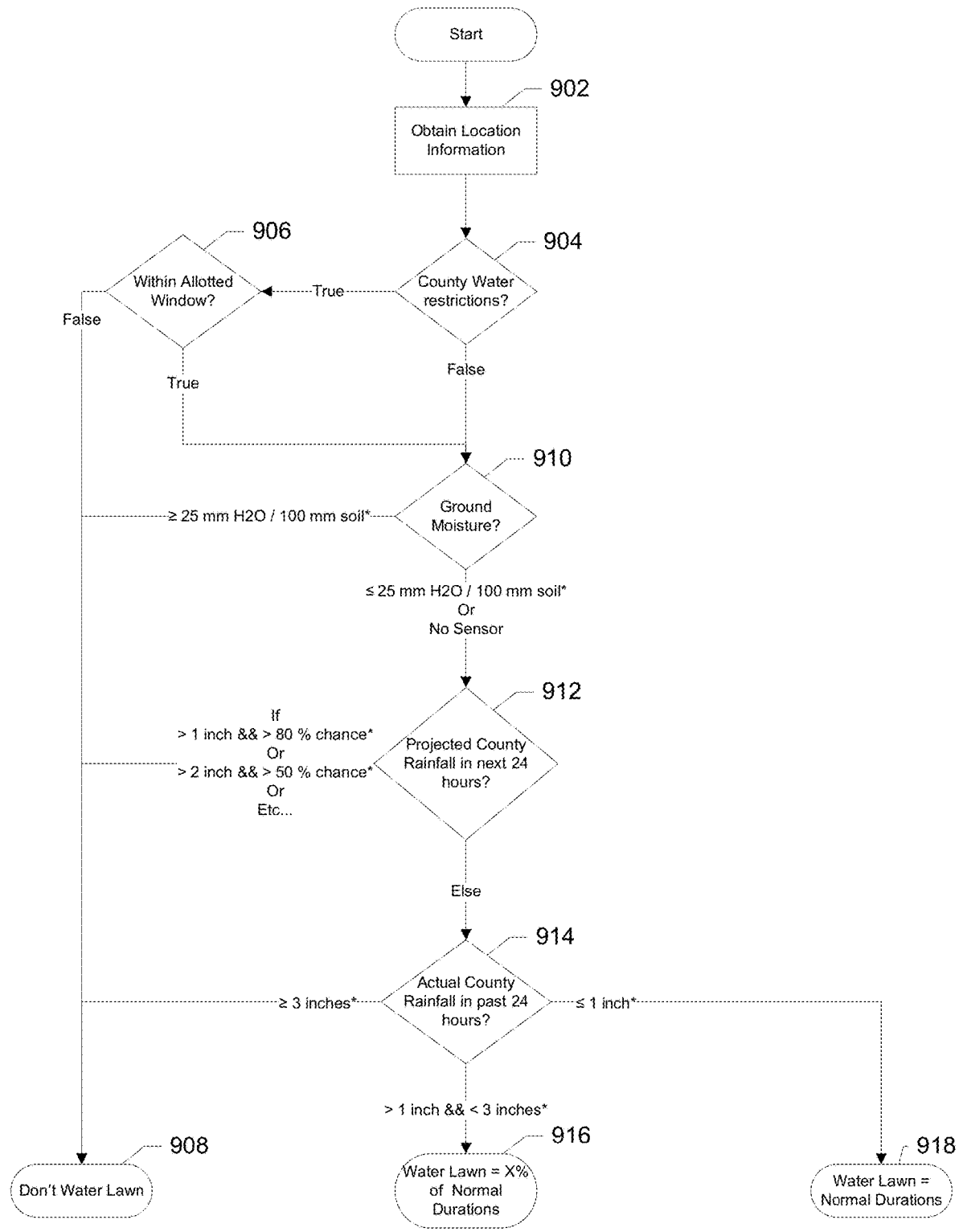
FIG. 9 illustrates an example flowchart of logic that one embodiment of a sprinkler controller may use in watering a property.

FIG. 9 illustrates an example flowchart of logic one embodiment of a sprinkler controller may use in watering a property.

In step 902, the sprinkler controller may obtain information about the property. For example, this may include latitude/longitude, what county the property is in, watering restrictions from the county, ground moisture levels, weather forecasts or predictions, and/or recent actual weather conditions, including rainfall levels.

In step 904, the sprinkler controller may determine if there are any county watering restrictions in place. If so, in step 906 the sprinkler controller may determine if the current time falls within the allotted watering window. If the current time does not allow for watering, then the sprinkler controller may not water 908 the lawn at the current time.

If there are no watering restrictions in place in step 904, or the watering restrictions do not prevent watering at the current time in step 906, then in step 910 the sprinkler controller may determine ground moisture levels. For example, the sprinkler controller may use its own moisture sensors, or receive information collected by a neighbor's moisture sensor.

If ground moisture levels are above a certain level—for example, over 25 mm of water per 100 mm of soil—then the sprinkler controller may not water 908 the lawn at the current time. If ground moisture levels are below a certain level—for example, below 25 mm of water per 100 mm of soil—or if there sensor information is not available, then the sprinkler controller may go to step 912.

In step 912, the sprinkler controller may determine the projected county rainfall in the next 24 hours. For example, the sprinkler controller may receive information from weather.com, another website that provides weather information, a local Doppler radar source, or another source.

If projected county rainfall in the next 24 hours is above a certain level—for example, over one inch of rain and an 80% chance of rain, or over 2 inches of rain and a 50% chance of rain, or another combination—then the sprinkler controller may not water 908 the lawn at the current time. If projected county rainfall in the next 24 hours is below a certain level, then the sprinkler controller may go to step 914.

In step 914, the sprinkler controller may determine the actual rainfall levels in the past 24 hours. The sprinkler controller may receive actual rainfall levels from weather.com or another website that provides weather information. Alternatively or additionally, the sprinkler controller may receive information from a rainfall sensor, such as a county rainfall sensor, a rainfall sensor installed as part of a neighbor's sprinkler system, or a rainfall sensor installed as part of the sprinkler controller's own sprinkler system. Alternatively or additionally, the sprinkler controller may receive actual rainfall levels from another source.

If actual rainfall levels in the past 24 hours are above a certain level—for example, greater than or equal to three inches—then the sprinkler controller may not water 908 the lawn at the current time.

If actual rainfall levels in the past 24 hours are below a certain level—for example, less than or equal to one inch—then the sprinkler controller may water 918 the lawn for normal durations. When watering for normal durations, the sprinkler controller may still use best practices (e.g., split allotted watering time into intervals, water different amounts based on grass or vegetation type, water according to zone profiles (e.g., garden, lawn, trees, etc.)).

If actual rainfall levels in the past 24 hours are within a certain range—for example, greater than one inch and less than three inches—it may be desirable to water 916 the lawn for a reduced amount. For example, the sprinkler controller may water at a lower level by reducing the amount of time, the water pressure used when watering (thereby reducing overall water distributed), reducing the number of intervals, or another method. For example, the sprinkler controller may water 50% of normal duration.

Aspects of the disclosure have been described in terms of illustrative embodiments thereof. While illustrative systems and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For example, any of the above described systems and methods or parts thereof may be combined with the other methods and systems or parts thereof described above. For example, one of ordinary skill in the art will appreciate that the steps illustrated in the illustrative figures may be performed in other than the recited order, and that one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

It is noted that various connections are set forth between elements in the following description. These connections are described in general and, unless specified otherwise, may be direct or indirect; this specification is not intended to be limiting in this respect.

The invention claimed is:

1. A method comprising:
   receiving, by a computing device, a sensor measurement for a first sprinkler controller associated with a first geographic region; and
   based on a determination that the sensor measurement satisfies a threshold and based on a determination of one or more conditions, of a second geographic region, that are based on a geographic association between the first geographic region and the second geographic region, sending, by the computing device and to a second sprinkler controller associated with the second geographic region, a message indicating an adjustment to a sprinkling schedule of the second sprinkler controller, wherein the threshold is based upon a watering restriction.

2. The method of claim 1,
   wherein the sending the message indicating the adjustment to the sprinkling schedule of the second sprinkler controller is further based on receiving the watering restriction.

3. The method of claim 1, wherein the sensor measurement comprises at least one of:
   a water runoff measurement;
   a water infiltration measurement;
   a water percolation measurement;
   a water saturation measurement; or
   a water usage rate.

4. The method of claim 1, further comprising:
   determining the adjustment to the sprinkling schedule of the second sprinkler controller based on at least one of:
      a difference between an elevation of the first geographic region and an elevation of the second geographic region;
      a weather forecast; or
      one or more characteristics associated with the second sprinkler controller.

5. The method of claim 1, wherein the adjustment comprises at least one of:
   modifying a watering profile of the second sprinkler controller,
   modifying a zone profile associated with the second sprinkler controller,
   modifying a sprinkling profile associated with the second sprinkler controller,
   modifying a time during which the second sprinkler controller causes watering,
   reducing an amount of water that the second sprinkler controller causes to be delivered by one or more sprinkler valves,
   adjusting a water flow rate associated with the second sprinkler controller, or
   limiting the sprinkling schedule to one or more predetermined days.

6. The method of claim 1, wherein the computing device is located remotely from the first sprinkler controller and the second sprinkler controller.

7. A method comprising:
   receiving, by a computing device, a watering restriction for a geographic location;
   receiving, by the computing device, a measurement associated with a second property within the geographic location; and based on a determination that a distance between the second property and a first property satisfies a threshold, sending, by the computing device and to a first sprinkler controller associated with the first property, a message indicating an adjustment to a sprinkling schedule for the first property based on the watering restriction and the measurement.

8. The method of claim 7, wherein the watering restriction indicates a volume of water that properties located within the geographic location can use.

9. The method of claim 7, wherein the watering restriction indicates a time when properties located within the geographic location can use water.

10. The method of claim 7, wherein the measurement comprises at least one of:
   a water runoff measurement;
   a water infiltration measurement;
   a water percolation measurement;
   a water saturation measurement; or
   a water usage rate.

11. The method of claim 7, further comprising:
   determining the adjustment to the sprinkling schedule for the first property based on at least one of:
      a difference between an elevation of the first property and an elevation of the second property;
      a weather forecast; or
      one or more characteristics associated with the first sprinkler controller.

12. The method of claim 7, wherein the adjustment comprises at least one of:
   modifying a watering profile associated with the first property,
   modifying a zone profile associated with the first property,
   modifying a sprinkling profile associated with the first property,
   modifying a time during which the first property uses water,
   reducing an amount of water that the first sprinkler controller causes to be delivered by one or more sprinkler valves,
   adjusting a water flow rate associated with the first sprinkler controller, or
   limiting the sprinkling schedule to one or more predetermined days.

13. The method of claim 7, wherein the computing device is located remotely from the first property and the second property.

14. A computing device comprising:
   one or more processors; and
   memory storing instructions that, when executed by the one or more processors, cause the computing device to:
      receive a sensor measurement for a first sprinkler controller associated with a first geographic region; and
      based on a determination that the sensor measurement satisfies a threshold and based on a determination of one or more conditions, of a second geographic region, that are based on a geographic association between the first geographic region and the second geographic region, a message indicating an adjustment to a sprinkling schedule of a second sprinkler controller associated with the second geographic region, wherein the threshold is based upon a watering restriction.

15. The computing device of claim 14, wherein the instructions, when executed by the one or more processors, cause the computing device to send the message further based on receiving the watering restriction.

16. The computing device of claim 14, wherein the sensor measurement comprises at least one of:
   a water runoff measurement;
   a water infiltration measurement;
   a water percolation measurement;
   a water saturation measurement; or
   a water usage rate.

17. The computing device of claim 14, wherein the instructions, when executed by the one or more processors, cause the computing device to determine the adjustment to the sprinkling schedule of the second sprinkler controller based on at least one of:
   a difference between an elevation of the first geographic region and an elevation of the second geographic region;
   a weather forecast; or
   one or more characteristics associated with the second sprinkler controller.

18. The computing device of claim 14, wherein the adjustment comprises at least one of:
   modifying a watering profile of the second sprinkler controller,
   modifying a zone profile associated with the second sprinkler controller,
   modifying a sprinkling profile associated with the second sprinkler controller,
   modifying a time during which the second sprinkler controller causes watering,
   reducing an amount of water that the second sprinkler controller causes to be delivered by one or more sprinkler valves,
   adjusting a water flow rate associated with the second sprinkler controller, or
   limiting the sprinkling schedule to one or more predetermined days.

19. The computing device of claim 14, wherein the computing device is located remotely from the first sprinkler controller and the second sprinkler controller.

20. A computing device comprising:
   one or more processors; and
   memory storing instructions that, when executed by the one or more processors, cause the computing device to:
      receive a watering restriction for a geographic location;
      receive a measurement associated with a second property within the geographic location; and
      based on a determination that a distance between the second property and a first property satisfies a threshold, send, to a first sprinkler controller associated with the first property, a message indicating an adjustment to a sprinkling schedule for the first property based on the watering restriction and the measurement.

21. The computing device of claim 20, wherein the watering restriction indicates a volume of water that properties located within the geographic location can use.

22. The computing device of claim 20, wherein the watering restriction indicates a time when properties located within the geographic location can use water.

23. The computing device of claim 20, wherein the measurement comprises at least one of:
   a water runoff measurement;
   a water infiltration measurement;
   a water percolation measurement;
   a water saturation measurement; or
   a water usage rate.

24. The computing device of claim 20, wherein the instructions, when executed by the one or more processors, cause the computing device to determine the adjustment to the sprinkling schedule for the first property based on at least one of:
- a difference between an elevation of the first property and an elevation of the second property;
- a predicted weather forecast; or
- one or more characteristics associated with the first sprinkler controller.

25. The computing device of claim 20, wherein the adjustment comprises at least one of:
- modifying a watering profile associated with the first property,
- modifying a zone profile associated with the first property,
- modifying a sprinkling profile associated with the first property,
- modifying a time during which the first property uses water,
- reducing an amount of water that the first sprinkler controller causes to be delivered by one or more sprinkler valves,
- adjusting a water flow rate associated with the first sprinkler controller, or
- limiting the sprinkling schedule to one or more predetermined days.

26. The computing device of claim 20, wherein the computing device is located remotely from the first property and the second property.

27. The method of claim 1, wherein the one or more conditions comprises at least one of moisture content of a soil associated with the second geographic region.

28. The computing device of claim 14, wherein the one or more conditions comprises at least one of moisture content of a soil associated with the second geographic region.

* * * * *